United States Patent
Hern et al.

(10) Patent No.: US 11,686,490 B2
(45) Date of Patent: *Jun. 27, 2023

(54) HVAC FUNCTIONALITY RESTORATION SYSTEMS AND METHODS

(71) Applicant: Johnson Controls Technology Company, Auburn Hills, MI (US)

(72) Inventors: Shawn A. Hern, Park City, KS (US);
Brian D. Rigg, Douglass, KS (US);
Tom R. Tasker, Andover, KS (US);
Cody J. Kaiser, Wichita, KS (US);
Andrew M. Boyd, Wichita, KS (US);
Noel Grajeda-Trevizo, Newton, KS (US)

(73) Assignee: Johnson Controls Tyco IP Holdings LLP, Milwaukee, WI (US)

(*) Notice: Subject to any disclaimer, the term of this patent is extended or adjusted under 35 U.S.C. 154(b) by 10 days.

This patent is subject to a terminal disclaimer.

(21) Appl. No.: 17/308,836

(22) Filed: May 5, 2021

(65) Prior Publication Data
US 2021/0254847 A1 Aug. 19, 2021

Related U.S. Application Data

(63) Continuation of application No. 16/000,672, filed on Jun. 5, 2018, now Pat. No. 11,002,453.

(Continued)

(51) Int. Cl.
*F24F 11/32* (2018.01)
*F24F 1/0007* (2019.01)
(Continued)

(52) U.S. Cl.
CPC ............ *F24F 11/32* (2018.01); *F24F 1/0007* (2013.01); *F24F 1/06* (2013.01); *F24F 3/0527* (2013.01);
(Continued)

(58) Field of Classification Search
CPC .. F24F 11/32; F24F 1/0007; F24F 1/06; F24F 3/0527; F24F 11/88; F24F 11/89; F24F 2140/20; F24F 2140/12
See application file for complete search history.

(56) References Cited

U.S. PATENT DOCUMENTS 5,630,325 A * 5/1997 Bahel ..................... F25B 41/35
62/222
5,706,190 A 1/1998 Russ et al.
(Continued)

FOREIGN PATENT DOCUMENTS

CN 102345915 A 2/2012
WO 2017121721 A1 7/2017

*Primary Examiner* — Shon G Foley
(74) *Attorney, Agent, or Firm* — Fletcher Yoder, P.C.

(57) ABSTRACT

The present disclosure includes techniques that enable a conditioned air system to automatically restore functionality and/or to operate at reduced functionality when a fault is detected, for example, to facilitate reducing likelihood that continuing operation with the fault present will decrease lifespan of the conditioned air system. To facilitate improving operation of the conditioned air system when a fault is present, the control system of the conditioned air system may utilize substitute sensor data and/or adjust its control algorithm. In this manner, the control system may facilitate improving operational reliability and/or availability of the conditioned air system, for example, by adaptively adjusting its operation to enable the conditioned air system to continue operating even when a fault is present, while reducing likelihood that the continued operation will reduce lifespan of the conditioned air system.

20 Claims, 16 Drawing Sheets

Related U.S. Application Data

(60) Provisional application No. 62/672,436, filed on May 16, 2018.

(51) Int. Cl.
  F24F 1/06 (2011.01)
  F24F 11/88 (2018.01)
  F24F 11/89 (2018.01)
  *F24F 3/052* (2006.01)
  *F24F 140/20* (2018.01)
  *F24F 140/12* (2018.01)

(52) U.S. Cl.
  CPC .............. F24F 11/88 (2018.01); F24F 11/89 (2018.01); *F24F 2140/12* (2018.01); *F24F 2140/20* (2018.01)

(56) References Cited

U.S. PATENT DOCUMENTS

| | | |
|---|---|---|
| 6,367,272 B1 | 4/2002 | Zeng et al. |
| 7,216,016 B2 | 5/2007 | Van Ostrand et al. |
| 7,296,426 B2 | 11/2007 | Butler et al. |
| 7,299,111 B2 | 11/2007 | Harrod |
| 7,412,842 B2 | 8/2008 | Pham |
| 7,752,853 B2 | 7/2010 | Singh et al. |
| 8,113,789 B2 | 2/2012 | Douglas et al. |
| 8,151,583 B2 * | 4/2012 | Douglas .................. F25B 41/35 62/157 |
| 8,151,585 B2 | 4/2012 | Douglas et al. |
| 9,103,557 B2 | 8/2015 | Choi et al. |
| 2007/0157650 A1 | 7/2007 | Takegami et al. |
| 2007/0228183 A1* | 10/2007 | Kennedy ............ G05D 23/1905 236/1 C |
| 2009/0183519 A1 | 7/2009 | Nishikawa et al. |
| 2009/0255278 A1 | 10/2009 | Taras et al. |
| 2011/0041532 A1 | 2/2011 | Preston et al. |
| 2012/0031985 A1* | 2/2012 | Do ........................ F25D 21/008 236/46 A |
| 2012/0291984 A1 | 11/2012 | Li et al. |
| 2014/0034284 A1 | 2/2014 | Butler et al. |
| 2014/0084072 A1 | 3/2014 | Conner et al. |
| 2014/0360211 A1* | 12/2014 | Hovel .................. B60H 1/3205 62/126 |
| 2015/0176931 A1 | 6/2015 | Aeberhard et al. |
| 2015/0330690 A1 | 11/2015 | Goel et al. |
| 2016/0076549 A1 | 3/2016 | Kelly et al. |
| 2017/0138624 A1 | 5/2017 | Kriz et al. |
| 2018/0245809 A1 | 8/2018 | Endel et al. |
| 2019/0353374 A1 | 11/2019 | Song et al. |

\* cited by examiner

HVAC FUNCTIONALITY RESTORATION SYSTEMS AND METHODS

CROSS REFERENCE TO RELATED APPLICATIONS

This application is a continuation of U.S. patent application Ser. No. 16/000,672, filed Jun. 5, 2018, entitled "HVAC Functionality Restoration Systems and Methods," which claims priority from and the benefit of U.S. Provisional Application Ser. No. 62/672,436, filed May 16, 2018, entitled "HVAC Functionality Restoration Systems and Methods," which are hereby incorporated by reference in their entirety for all purposes.

BACKGROUND

The present disclosure generally relates to heating, ventilation, and air conditioning (HVAC) systems and, more particularly, to addressing system faults that may occur in an HVAC system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Heating, ventilation, and air conditioning (HVAC) systems are often deployed in buildings to facilitate controlling air conditions, such as temperature and/or humidity, within the buildings. For example, an HVAC system may include equipment, such as an HVAC unit, which operates to produce temperature controlled air that is circulated through internal spaces of a building. However, in some instances, one or more faults may occur in the HVAC system during operation. For example, a fault may occur when a component in the HVAC system, such as a sensor, begins operating improperly or ceases operating completely. At least in some instances, continuing to operate an HVAC system while a fault is present may lead to a reduction in lifespan of the HVAC system or components in the HVAC system.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a control board that restores functionality to conditioned air equipment when the conditioned air equipment experiences a fault is programmed to receive an indication that a suction pressure sensor is faulty. In response to receiving the indication that the suction pressure sensor is faulty, the control board is programmed to determine whether to substitute suction pressure sensor information provided by the suction pressure sensor with temperature sensor information, variable speed drive information, and/or indoor fan speed information. The control board is also programmed to then operate the conditioned air equipment using the temperature sensor information, the variable speed drive information, and/or the indoor fan speed information, instead of the suction pressure sensor information.

In another embodiment, a method that restores functionality to conditioned air equipment when the conditioned air equipment experiences a fault includes receiving an indication that a discharge pressure sensor associated with a compressor of the conditioned air equipment is faulty. The method also includes, in response to receiving the indication that the discharge sensor is faulty, determining whether to substitute pressure sensor information, temperature sensor information, and/or variable speed drive information, for the discharge pressure sensor information provided by the discharge pressure sensor. The method further includes then operating the conditioned air equipment using the pressure sensor information, the temperature sensor information, and/or the variable speed drive information, instead of the discharge pressure sensor information.

In yet another embodiment, a tangible, non-transitory, machine-readable medium includes machine-readable instructions executable by a processor of a control board that restore functionality to conditioned air equipment when the conditioned air equipment experiences a fault. The instructions, when executed by the processor, cause the processor to receive an indication that a first zone thermostat of the conditioned air equipment is faulty. The first zone thermostat controls air flow in a first zone of a building and provides first zone thermostat information to the processor. The instructions also cause the processor to, in response to receiving the indication that the first zone thermostat is faulty, determine a second zone thermostat to substitute for the first zone thermostat. The second zone thermostat controls air flow in a second zone of the building. The instructions further cause the processor to, in response to receiving the indication that the first zone thermostat is faulty, operate the conditioned air equipment using second zone thermostat information provided by the second zone thermostat instead of the first zone thermostat information.

BRIEF DESCRIPTION OF THE DRAWINGS

Various aspects of the present disclosure may be better understood upon reading the following detailed description and upon reference to the drawings, in which.

DETAILED DESCRIPTION

Figure 1:
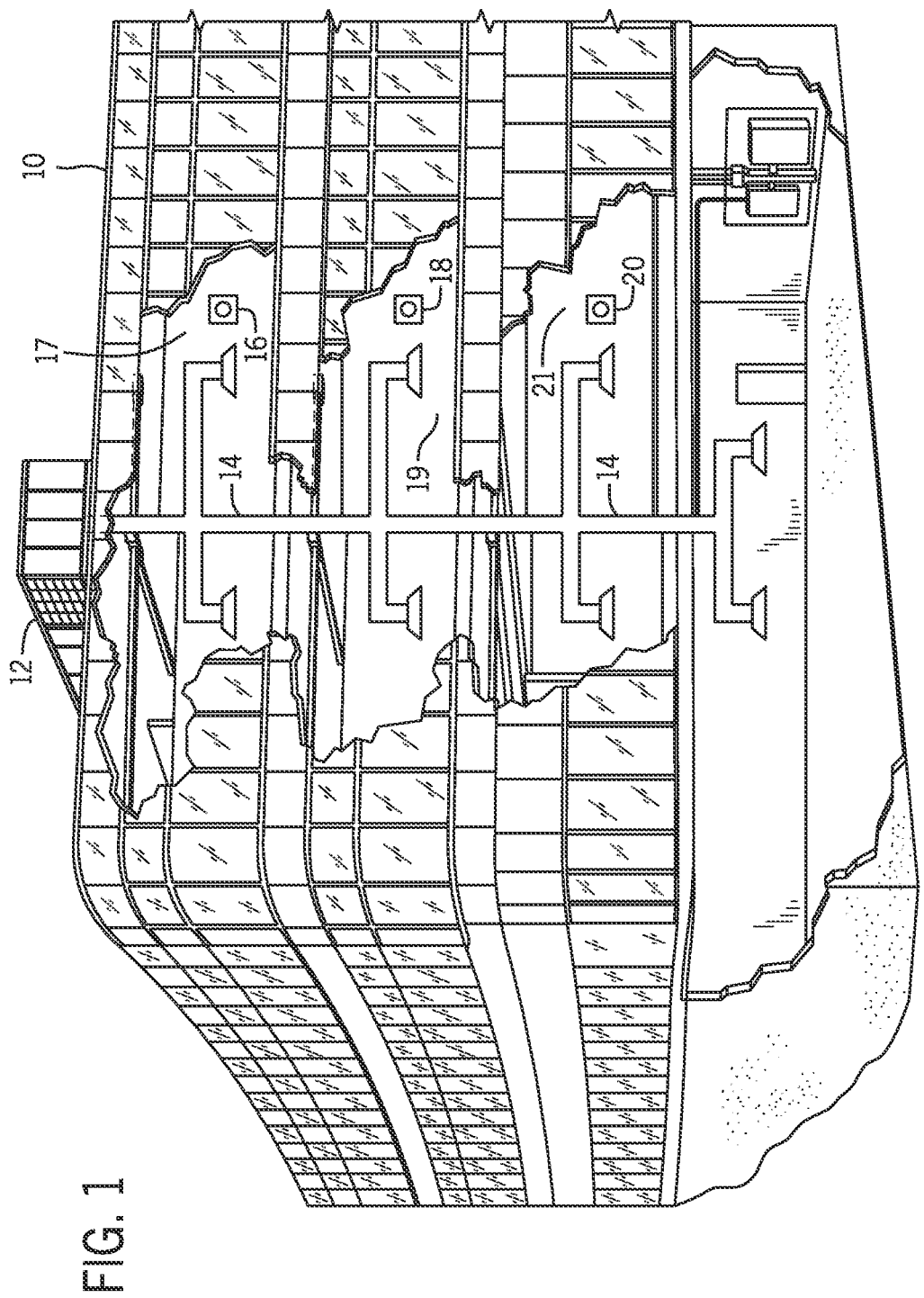
FIG. 1 illustrates a heating, ventilating, and air conditioning (HVAC) system for building environmental management that may employ one or more HVAC units, in accordance with an embodiment of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Generally, a heating, ventilation, and air conditioning (HVAC) system may operate to facilitate controlling air conditions or parameters, such as temperature and/or humidity, present within a building. However, in some instances, one or more faults may occur in the HVAC system, such as a suction pressure sensor fault, a discharge pressure sensor fault, a suction temperature sensor fault, a discharge temperature sensor fault, an ambient temperature sensor fault, and the like.

To facilitate improving HVAC availability, in some instances, the HVAC system may continue to operate even when one or more faults are present. However, at least in some instances, continuing to operate the HVAC system with a fault present may reduce lifespan of components in the HVAC system and/or the HVAC system as a whole. For example, if there is a suction pressure sensor fault, and the HVAC system operates with a suction pressure outside of an appropriate operating range, the lifetime of the components in the HVAC system and/or the HVAC system as a whole may be reduced due to excessive or insufficient suction pressure.

Accordingly, the present disclosure provides techniques that enable an HVAC system to automatically restore functionality and/or to operate at reduced functionality when a fault is detected, for example, to facilitate reducing likelihood that continuing operation with the fault present will decrease lifespan of components in the HVAC system or the HVAC system as a whole. In some embodiments, a control system may generally control operation based at least in part on sensor data received from one or more sensors implemented in the HVAC system. For example, a refrigerant loop implemented in the HVAC system may include a suction pressure sensor and a suction temperature sensor. By executing a first control algorithm based on measured suction pressure and measured suction temperature, the control system may determine a target valve position for an expansion valve implemented in the refrigerant loop and instruct the expansion valve accordingly, for example, via one or more control signals or control commands.

To facilitate improving operation of an HVAC system when a fault is present, the control system may utilize substitute sensor data and/or adjust its control algorithm. For example, when the suction pressure sensor is faulty, the control system may utilize a temperature sensor implemented upstream relative to the suction temperature sensor in the refrigerant loop as a substitute sensor. In other words, the control system may utilize upstream temperature data received from the upstream temperature sensor, for example, instead of pressure data that may otherwise be output from the suction pressure sensor.

Additionally, in some embodiments, the control system may adjust its control algorithm to accommodate the substitute sensor data. For example, instead of the first control algorithm based on measured suction pressure and measured suction temperature, the control system may execute a second control algorithm based on measured suction temperature and the measured upstream temperature. In other words, when a suction pressure sensor is faulty, the control system may determine the target valve position for the expansion valve using a temperature-temperature control algorithm, for example, instead of a temperature-pressure control algorithm. In this manner, the control system may facilitate improving operational reliability and/or availability of the HVAC system, for example, by adaptively adjusting its operation to enable the HVAC system to continue operating even when one or more faults are present while reducing likelihood that the continued operation will reduce lifespan of components in the HVAC system or the HVAC system as a whole.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12 or conditioned air unit. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may include a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

In any case, the HVAC unit 12 may be an air cooled device that implements a refrigeration cycle to provide conditioned air to the building 10. For example, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the air is conditioned, the HVAC unit 12 may supply the conditioned air to the building 10 via ductwork 14 extending throughout the building 10 from the HVAC unit 12. For example, the ductwork 14 may extend to various individual floors or other sections of the building 10. In some embodiments, the HVAC unit 12 may include a heat pump that provides both heating and cooling to the building 10, for example, with one refrigeration circuit implemented to operate in multiple different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other equipment, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and/or the like. Moreover, the control device 16 may include computer systems that are integrated with or separate from other building control or monitoring systems, and even systems that are remote from the building 10. In some embodiments, the HVAC unit 12 may be operate in multiple zones of the building, and be coupled to multiple control devices that each control flow of air in a respective zone. For example, a first control device 16 may control the flow of air in a first zone 17 of the building, a second control device 18 may control the flow of air in a second zone 19 of the building, and a third control device 20 may control the flow of air in a third zone 21 of the building.

Figure 2:
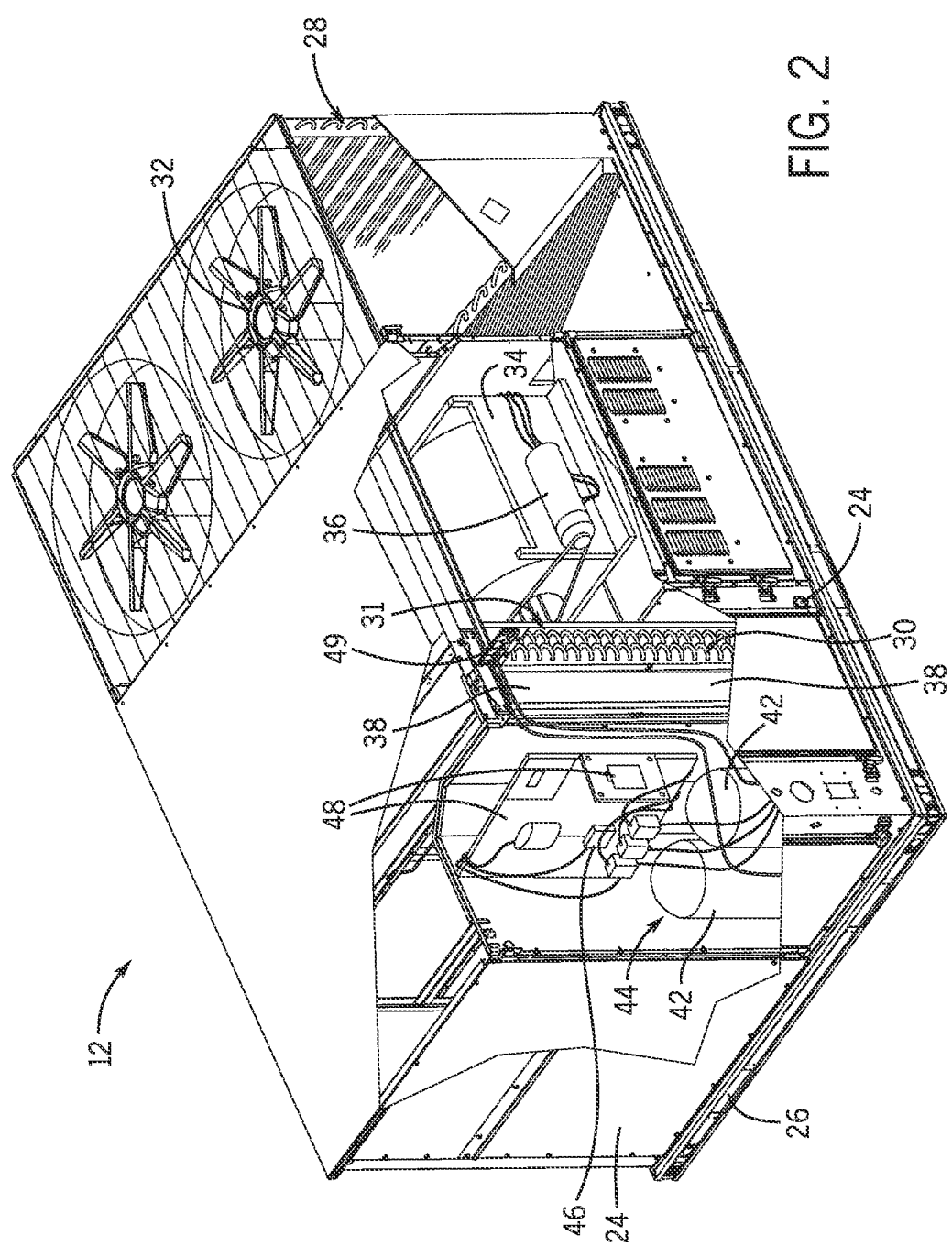
FIG. 2 is a perspective view of a HVAC unit of the HVAC system of FIG. 1, in accordance with an embodiment of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, and/or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12, for example, to provide structural support and/or protect the internal components from environmental contaminant and/or other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and/or the like. Together, the heat exchangers 28 and 30 may implement a thermal cycle in which the refrigerant undergoes phase changes and/or temperature changes as it flows through the heat exchangers 28 and 30 to produce heated and/or cooled air.

For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 may draw air from the environment through the heat exchanger 28. As it flows through the heat exchanger 28, air may be heated or cooled before being released back to the environment surrounding the rooftop unit 12. A blower assembly 34, powered by a motor 36, may draw air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to reduce likelihood of contaminants contacting the heat exchanger 30.

The HVAC unit 12 also may include other equipment for implementing the thermal cycle. Compressors 42 may increase the pressure and/or temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and/or devices may be included in the HVAC unit 12, such as a solid-core filter drier, a drain pan, a disconnect switch, an economizer, pressure switches, phase monitors, and humidity sensors, among other things.

The HVAC unit 12 may receive electrical power via a terminal block 46. For example, a high voltage power source may be connected to the terminal block 46 to power the equipment. The operation of the HVAC unit 12 may be governed or regulated by a control board 48. The control board 48 may include control circuitry connected to a thermostat, a sensor, and/or an alarm. One or more of these components may be referred to herein separately or collectively as the control device 16. The control circuitry may be implemented to control operation of the equipment, provide alarms, and/or monitor safety switches. Wiring 49 may connect the control board 48 and the terminal block 46 to the equipment of the HVAC unit 12.

Figure 3:
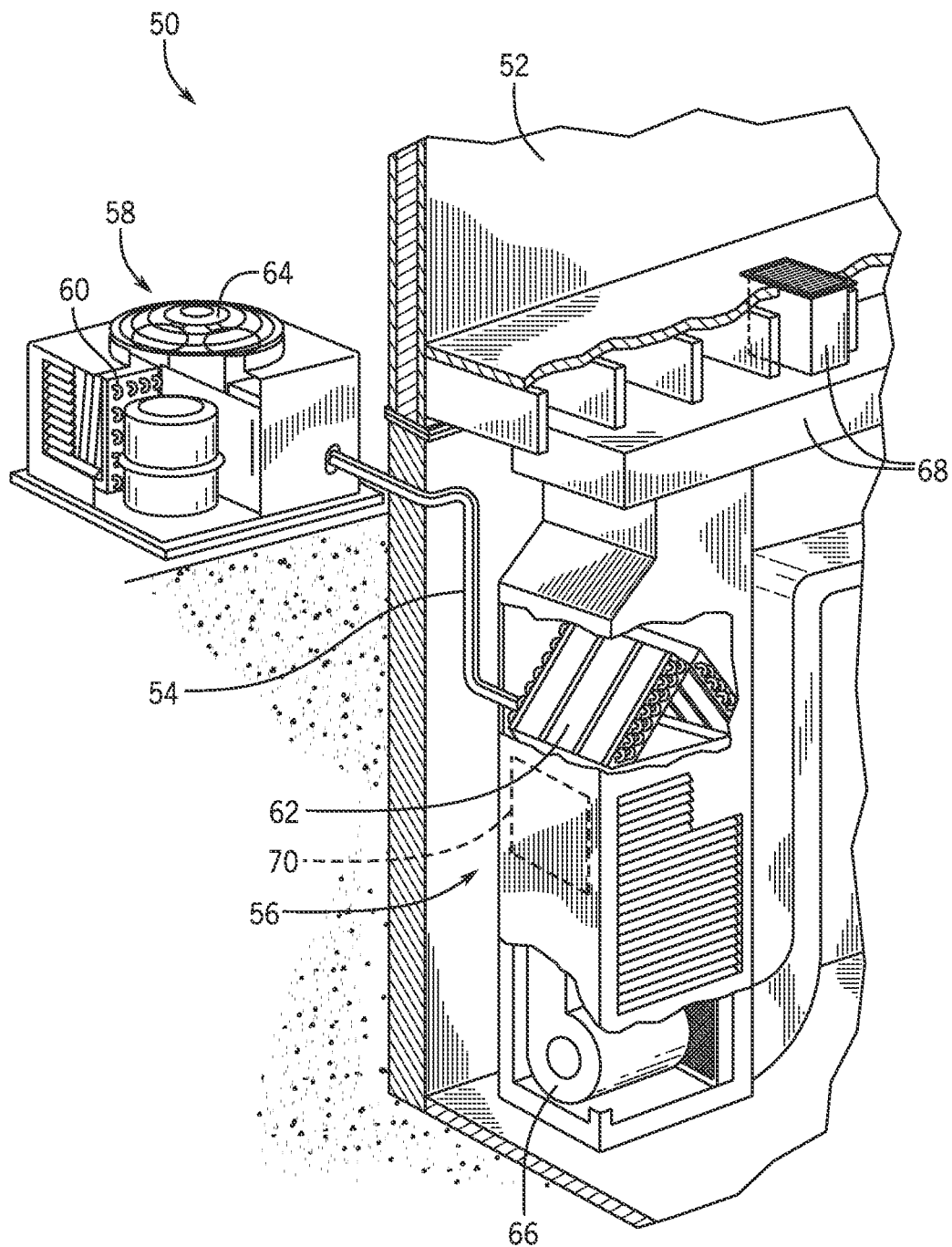
FIG. 3 illustrates a residential heating and cooling system, in accordance with an embodiment of the present disclosure.

FIG. 3 illustrates a residential heating and cooling system 50, also in accordance with present techniques. The residential heating and cooling system 50 may provide heated air to a residential structure, cooled air to a residential structure, ventilation for the residential structure, and/or improved indoor air quality (IAQ) through devices, such as ultraviolet lights and/or air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 may transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 may serve as a condenser for re-condensing vaporized refrigerant flowing from the indoor unit 56 to the outdoor unit 58 via one of the refrigerant conduits 54. In these applications, a heat exchanger 62 of the indoor unit may function as an evaporator. Specifically, the heat exchanger 62 may receive liquid refrigerant, which may be expanded by an expansion device, and evaporate the refrigerant before returning it to the outdoor unit 58.

The outdoor unit 58 may draw environmental air through the heat exchanger 60 using a fan 64 and expels the air above the outdoor unit 58. When operating in an air conditioner mode, the air heated by the heat exchanger 60 within the outdoor unit 58 exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52.

The overall system operates to maintain a desired temperature as set by a system controller. When the temperature sensed inside the residence 52 is higher than the setpoint on the thermostat, or the setpoint plus a small amount, the residential heating and cooling system 50 may become operative to refrigerate or cool additional air for circulation through the residence 52. When the temperature reaches the setpoint, or the setpoint minus a small amount, the residential heating and cooling system 50 may stop the refrigeration cycle temporarily.

The residential heating and cooling system 50 may also operate in a heat pump mode. When operating in the heat pump mode, the roles of heat exchangers 60 and 62 may be reversed. That is, the heat exchanger 60 of the outdoor unit 58 may serve as an evaporator to evaporate refrigerant and thereby cool air entering the outdoor unit 58 as the air passes over outdoor the heat exchanger 60. The indoor heat exchanger 62 may receive a stream of air blown over it and heat the air by condensing the refrigerant.

In some embodiments, the indoor unit 56 may include a furnace system 70. For example, the indoor unit 56 may include the furnace system 70 when the residential heating and cooling system 50 is not implemented to operate as a heat pump. The furnace system 70 may include a burner assembly and heat exchanger, among other components, inside the indoor unit 56. Fuel may be provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
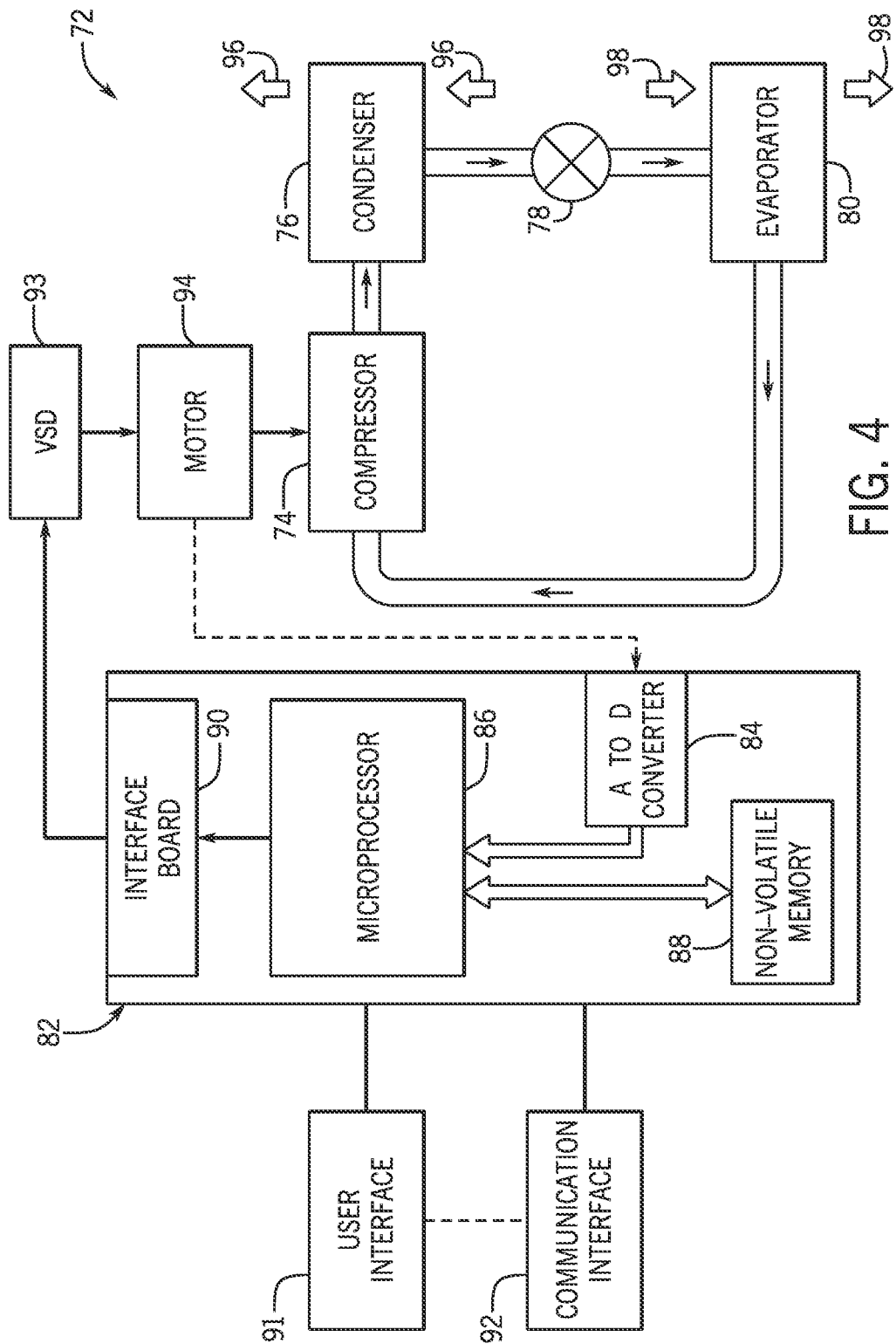
FIG. 4 illustrates a vapor compression system that may be used in the HVAC system of FIG. 1 and in the residential heating and cooling system of FIG. 3, in accordance with an embodiment of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90.

The control panel 82 and its components may function to regulate operation of the vapor compression system 72 based on feedback from an operator, from sensors of the vapor compression system 72 that detect operating conditions, and so forth. The microprocessor 86 may include any type of processing circuitry, such as one or more processors, one or more "general-purpose" microprocessors, one or more special-purpose microprocessors, and/or one or more application specific integrated circuits (ASICS), or some combination thereof. For example, the microprocessor 86 may include one or more reduced instruction set (RISC) processors.

The control panel 82 may be communicatively coupled to and/or include a user interface 91 that provides information to and/or receives information from a user. The user interface 91 may include any suitable combination of input and output devices, such as an electronic display, a touchscreen, a stylus, a keypad, a button, and/or the like, to enable communicating system fault and/or malfunction information to a user.

In some embodiments, the control panel 82 may be communicatively coupled to and/or include a communication interface 92 that may enable communication with any suitable communication network, such as wiring terminals, a cellular network, a WiFi network, a personal area network (PAN), a local area network (LAN), a wide area network (WAN), and/or the like. For example, the communication interface 92 may enable the control panel 82 to communicate with a user interface 91 implemented on a user's mobile device, which is also communicatively coupled to the communication network.

In some embodiments, the vapor compression system 72 may use one or more of a variable speed drive (VSDs) 93, a motor 94, the compressor 74, the condenser 76, the expansion valve or device 78, and/or the evaporator 80. The motor 94 may drive the compressor 74 and may be powered by the variable speed drive (VSD) 93. The VSD 93 may receive alternating current (AC) power having a particular fixed line voltage and fixed line frequency from an AC power source, and provide power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 may compress a refrigerant vapor and deliver the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant may exit the evaporator 80 and return to the compressor 74 by a suction line to complete the cycle.

In some embodiments, the vapor compression system 72 may further include a reheat coil in addition to the evaporator 80. For example, the reheat coil may be positioned downstream of the evaporator 80 relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC system. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

The description above with reference FIGS. 1-4 is intended to be illustrative of the context of the present disclosure. The techniques of the present disclosure may update features of the description above. In particular, as will be discussed in more detail below, the present disclosure provides techniques that enable an HVAC system to restore functionality and/or operate at reduced functionality when one or more faults are present.

Figure 5:
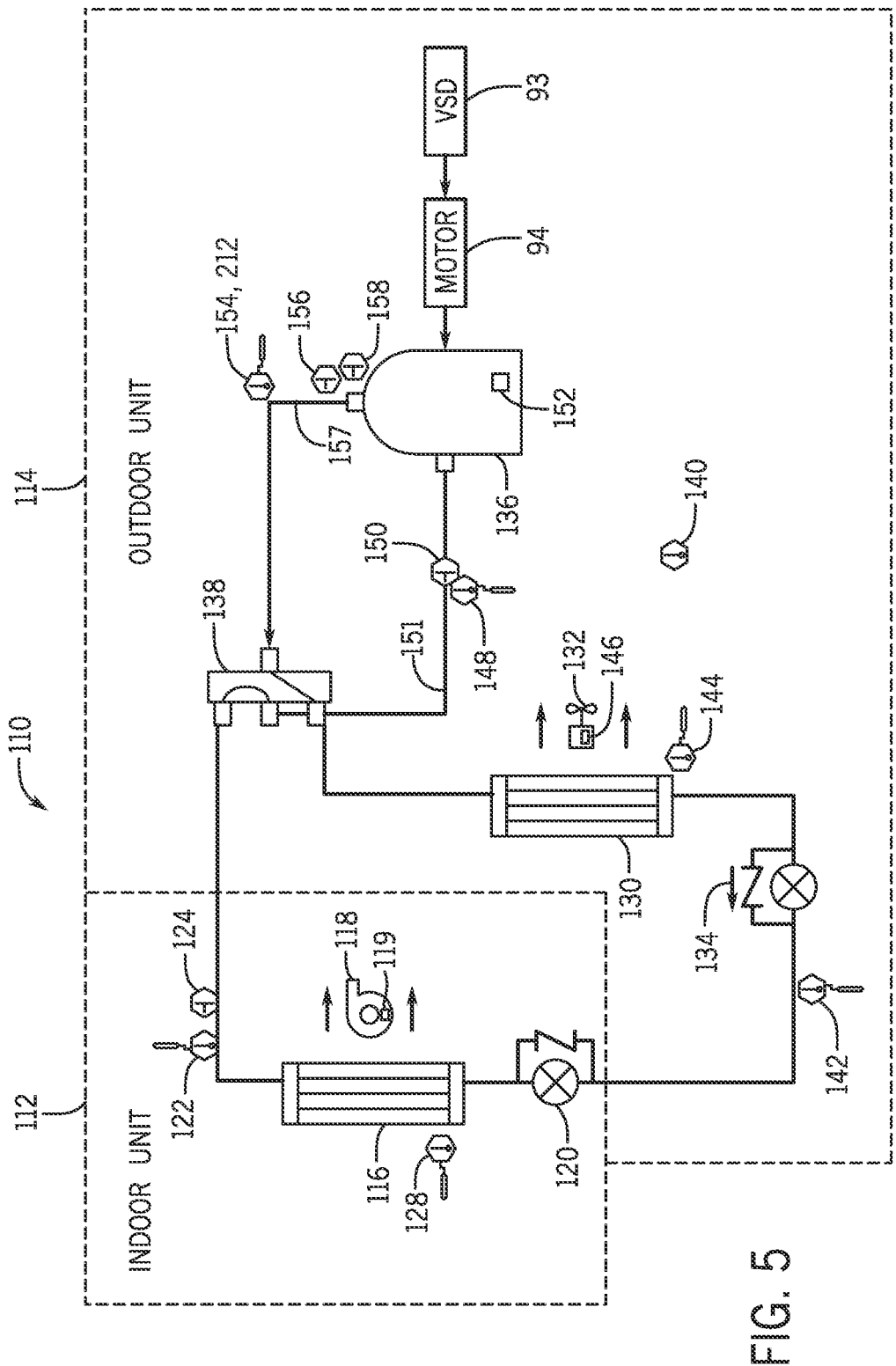
FIG. 5 is a schematic diagram of an HVAC system that restores functionality and/or operates at reduced functionality when encountering an HVAC system fault, in accordance with an embodiment of the present disclosure.

To help illustrate, a schematic diagram of an HVAC system 110 or conditioned air system that may restore functionality and/or operate at reduced functionality when encountering an HVAC system fault, in accordance with an embodiment of the present disclosure, is shown in FIG. 5. The HVAC system 110 may include conditioned air or HVAC equipment, such as an indoor unit 112 and/or an outdoor unit 114.

As in the depicted embodiment, the indoor unit 112 may include an indoor heat exchanger 116 and a blower 118. As described above, the indoor unit 112 and, thus, the indoor heat exchanger 116 may act as a condenser when heating a building and as an evaporator when cooling the building. The indoor unit 112 may also include an indoor expansion device 120, for example, selectively bypassed such that refrigerant bypasses the indoor expansion device 120 when the indoor heat exchanger 116 may act as the condenser and flows through the indoor expansion device 120 when the indoor heat exchanger 116 acts as the evaporator.

Moreover, the indoor unit 112 may include a variety of sensors that send information via sensor data or measurement signals to the control panel 82. For example, the indoor unit 112 may include an indoor coil sensor 128, an indoor temperature sensor 122, an indoor pressure sensor 124, and a blower sensor 119. In some embodiments, the indoor coil sensor 128 may be implemented to measure temperature of refrigerant coils in the indoor heat exchanger 116. Additionally, the indoor temperature sensor 122 may be implemented to measure temperature and the indoor temperature sensor 122 may be implemented to measure pressure of refrigerant in the indoor unit 112, for example, output from the evaporator. Furthermore, the blower sensor 119 may be implemented to measure operational parameters of the blower 118, such as actuation speed of the blower 118 and/or airflow through the blower 118, for example, in cubic feet per minute (CFM).

Additionally, as in the depicted embodiment, the outdoor unit 114 may include an outdoor heat exchanger 130 and a fan 132. As described above, the outdoor unit 114 and, thus, the outdoor heat exchanger 130 may act as the evaporator when heating a building and as a condenser when cooling the building. The outdoor unit 114 may also include an outdoor expansion device 134, for example, selectively bypassed such that refrigerant bypasses the output expansion device 134 when the outdoor heat exchanger 130 may act as the evaporator and flows through the outdoor expansion device 134 when the indoor heat exchanger 130 act as the condenser.

As in the depicted embodiment, the outdoor unit 114 may also include a compressor 136 and a four-way valve 138. In particular, the compressor 136 may receive refrigerant via a suction line, compress the refrigerant to increase temperature and/or pressure, and output the refrigerant via a discharge line. Additionally, in some embodiments, the four-way valve 138 may enable selectively operating in an air conditioning mode and a heat pump mode, for example, by controlling whether each of the suction line and the discharge line is coupled to the outdoor heat exchanger 130 or the indoor heat exchanger 116.

Moreover, the outdoor unit 114 may include a variety of sensors that send information via sensor data or measurement signals to the control panel 82. For example, the outdoor unit 114 may include an ambient temperature sensor 140, liquid line temperature sensor 142, an outdoor coil sensor 144, a fan sensor 146, a suction line temperature sensor 148, a suction line pressure sensor 150, a compressor sensor 152, a discharge line temperature sensor 154, and a discharge line pressure sensor 156. In some embodiments, the outdoor coil sensor 144 may be implemented to measure temperature of refrigerant coils in the outdoor heat exchanger 130. Additionally, the fan sensor 146 may be implemented to measure operational parameters of the fan 132, such as actuation speed of the fan 132 and/or airflow through the fan 132, for example, in cubic feet per minute (CFM). Similarly, the compressor sensor 152 may be implemented to measure operational parameters of the compressor 136, such as actuation speed of the compressor 136 and/or flow rate of refrigerant through the compressor 136. Furthermore, the ambient temperature sensor 140 may be implemented to measure temperature of environmental air, for example, outside the building.

In some embodiments, the suction line temperature sensor 148 may be implemented to measure temperature and the suction line pressure sensor 150 to measure pressure of refrigerant within the suction line 151. Additionally, the discharge line temperature sensor 154 may be implemented to measure temperature and the discharge line pressure sensor 156 may be implemented to measure pressure of refrigerant within the discharge line 157. As in the depicted embodiment, the outdoor unit 114 may also include a high pressure switch 158, for example, which transitions to an open position when discharge pressure of the compressor 136 exceeds a threshold to facilitate reducing pressure within the discharge line.

However, as described above, one or more faults may occur during operation of an HVAC system 110. To facilitate improving operational reliability and/or availability, when the HVAC system 110 undergoes a system fault due to a faulty sensor, the HVAC system 110 may restore functionality and/or operate at reduced functionality, for example, by substituting a downstream or upstream sensor for the faulty sensor. In some embodiments, the HVAC system 110 may selectively execute control algorithms to determine substitute sensor data, for example, based on sensor data received from another sensor in place of the sensor data typically provided by the faulty sensor.

Figure 6:
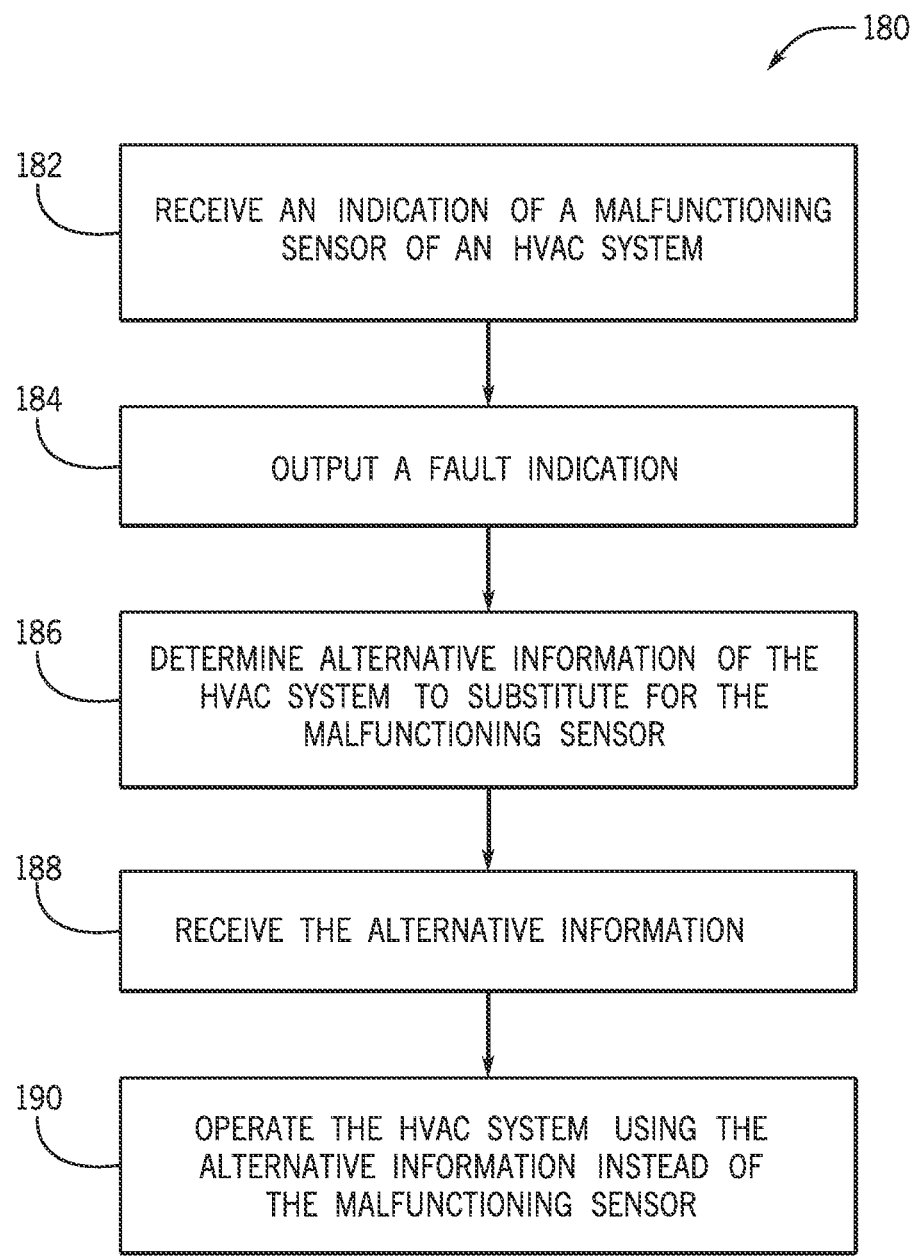
FIG. 6 is a flow diagram of a process for restoring functionality to the HVAC system of FIG. 5 and/or operating the HVAC system of FIG. 5 at reduced functionality when encountering an HVAC system fault, in accordance with an embodiment of the present disclosure.

With the foregoing in mind, FIG. 6 is a flow diagram of a process 180 for restoring functionality to the HVAC system 110 and/or operating the HVAC system 110 at reduced functionality when encountering an HVAC system fault, in accordance with an embodiment of the present disclosure. The process 180 may be performed by any suitable device that may receive an indication of a malfunctioning sensor of the HVAC system 110, determine alternative information to substitute for the malfunctioning sensor, and operate the HVAC system 110 using the alternative sensor information. While the process 180 is described using steps in a specific sequence, it should be understood that the present disclosure contemplates that the described steps may be performed in different sequences than the sequence illustrated, and certain described steps may be skipped or not performed altogether. In some embodiments, the process 180 may be implemented by executing instructions stored in a tangible, non-transitory, computer-readable medium, such as the non-volatile memory 88, using a processor, such as the microprocessor 86.

As illustrated, the control board 82 may receive, at process block 182, an indication of a malfunctioning or otherwise faulty sensor of the HVAC system 110. In particular, the control board 82 may determine that sensor information sent by the malfunctioning sensor and received by the control board 82 is inaccurate or not being sent. In some cases, the control board 82 may determine that sensor information sent by the malfunctioning sensor is inaccurate when it is outside a range of acceptable sensor values.

The control board 82 may then output, at process block 184, a fault indication. For example, the control board 82 may provide an alert or message to the user interface 91 to inform a user of the fault. In some embodiments, the fault indication may be provided via the communication interface 92 to the user interface 91 of a user's mobile device.

The control board 82 may determine, at process block 186, alternative information of the HVAC system 110 to substitute for the malfunctioning sensor. In some embodiments, the control board 82 may substitute sensor data from an immediately downstream or upstream sensor for the malfunctioning sensor. In such embodiments, the control board 82 may apply any suitable offset and/or multiplier to the substitute sensor information to more closely match the sensor information typically received from the malfunctioning sensor. In additional or alternative embodiments, the control board 82 may use an algorithm, such as in conjunction with the downstream or upstream sensor, to determine the alternative information to substitute in place of the sensor information typically provided by the malfunctioning sensor, as described in further detail in FIGS. 7-16 below.

The control board 82 may then receive, at process block 188, the alternative information. That is, the control board 82 may receive the substitute sensor information from a downstream or upstream sensor. In some embodiments, the control board 82 may use an algorithm, such as in conjunction with the downstream or upstream sensor, to determine the alternative information to substitute in place of the sensor information typically provided by the malfunctioning sensor.

The control board 82 may operate, at process block 190, the HVAC system 110 using the alternative information instead of the malfunctioning sensor. In particular, the control board 82 may use the alternative information in place of the sensor information typically provided by the malfunctioning sensor. Because the alternative information may be an estimate of the sensor information typically provided by the malfunctioning sensor, the control board 82 may restore functionality to the HVAC system 110 and/or operate the HVAC system 110 at reduced functionality when encountering an HVAC system fault by using the alternative information. In this manner, performing the process 180 may restore functionality to the HVAC system 110 and/or operate the HVAC system 110 at reduced functionality when encountering a sensor fault.

Figure 7:
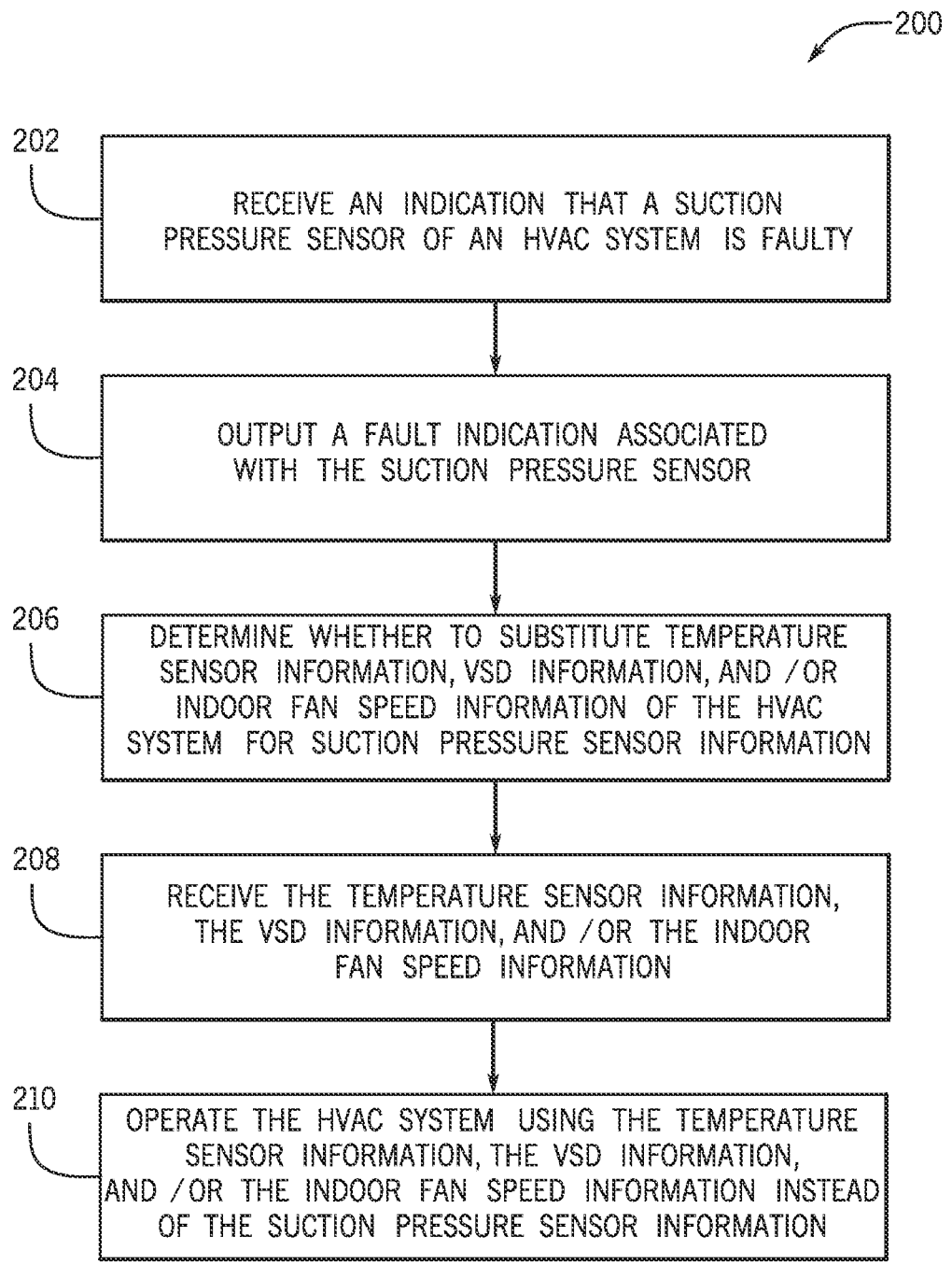
FIG. 7 is a flow diagram of a process for restoring functionality to the HVAC system of FIG. 5 and/or operating the HVAC system of FIG. 5 at reduced functionality when encountering a suction pressure sensor fault, in accordance with an embodiment of the present disclosure.

FIG. 7 is a flow diagram of a process 200 for restoring functionality to the HVAC system 110 and/or operating the HVAC system 110 at reduced functionality when encountering a suction pressure sensor fault, in accordance with an embodiment of the present disclosure. The process 200 may be performed by any suitable device that may receive an indication that the suction line pressure sensor 150 of an HVAC system 110 is faulty, determine alternative information to substitute for the faulty suction line pressure sensor 150, and operate the HVAC system 110 using the alternative sensor information. While the process 200 is described using steps in a specific sequence, it should be understood that the present disclosure contemplates that the described steps may be performed in different sequences than the sequence illustrated, and certain described steps may be skipped or not performed altogether. In some embodiments, the process 200 may be implemented by executing instructions stored in a tangible, non-transitory, computer-readable medium, such as the non-volatile memory 88, using a processor, such as the microprocessor 86.

As illustrated, the control board 82 may receive, process block 202, an indication that a suction line pressure sensor 150 of an HVAC system 110 is faulty. In particular, the control board 82 may determine that sensor information sent by the faulty suction line pressure sensor 150 and received by the control board 82 is inaccurate or not being sent. In some cases, the control board 82 may determine that sensor information sent by the suction line pressure sensor 150 is inaccurate when it is outside a range of acceptable suction pressure sensor values.

The control board 82 may then output, at process block 204, a fault indication associated with the suction line pressure sensor 150. For example, the control board 82 may provide an alert or message to the user interface 91 to inform a user of the faulty suction line pressure sensor 150. In some embodiments, the fault indication may be provided via the communication interface 92 to the user interface 91 of a user's mobile device.

The control board 82 may determine, at process block 206, to use temperature sensor information, VSD information, and/or indoor fan speed information of the HVAC system 110 to substitute for suction pressure sensor information. The control board 82 may determine what information to use based on the operation to be performed by the HVAC system 110. The control board 82 may then receive, at process block 208, the temperature sensor information, the VSD information, and/or the indoor fan speed information, and operate, at process block 210, the HVAC system 110 using the temperature sensor information, the VSD information, and/or the indoor fan speed information instead of the faulty suction pressure sensor information.

For example, when the HVAC system 110 is controlling the expansion valve 120 to heat a building, the control board 82 may use temperature sensor information provided by a temperature sensor disposed at an entering side of the outdoor heat exchanger 130, such as the outdoor coil temperature sensor 144. In particular, the control board 82 may use a temperature control algorithm in conjunction with the temperature sensor information to control the expansion valve 120 instead of the suction pressure sensor information.

As another example, when the HVAC system 110 is protecting an envelope limit, such as to maintain separation between the indoor and outdoor environments including resistance to the transfer of air, heat, humidity, and the like, by controlling the outdoor fan 132 to heat the building, the control board 82 may use suction temperature sensor information provided by the suction temperature sensor 148. In particular, the control board 82 may estimate pressure information based on inferring superheat information from the suction temperature sensor information provided by the suction temperature sensor 148. The estimated pressure information may then be used to protect the envelope limit by controlling the outdoor fan 132. Additionally or alternatively, the control board 82 may use VSD information from the VSD 93 to protect the envelope limit. For example, the control board 82 may use the frequency and/or the voltage output by the VSD 93 to the motor 94 to protect the envelope limit. In some embodiments, the control board 82 may use the resulting alternating current speed and/or the torque of the motor 94 resulting from applying the frequency and/or the voltage output by the VSD 93 to protect the envelope limit.

As yet another example, when the HVAC system 110 is protecting the envelope limit by controlling the indoor blower 118 to cool the building, the control board 82 may use the suction temperature sensor information provided by the suction temperature sensor 148. In particular, the control board 82 may estimate pressure information based on inferring superheat information from the suction temperature sensor information provided by the suction temperature sensor 148. The estimated pressure information may then be used to protect the envelope limit by controlling the indoor blower 118. Additionally or alternatively, the control board 82 may use VSD information from the VSD 93 to protect the envelope limit. For example, the control board 82 may use the frequency and/or the voltage output by the VSD 93 to the motor 94 to protect the envelope limit. In some embodiments, the control board 82 may use the resulting alternating current speed and/or the torque of the motor 94 resulting from applying the frequency and/or the voltage output by the VSD 93 to protect the envelope limit.

As another example, when the HVAC system 110 is protecting oil and/or scroll set, such as a setting of a scroll, of the compressor 136, the control board 82 may use discharge temperature sensor information provided by the discharge line temperature sensor 154 and/or preferable dome temperature sensor information provided by a dome temperature sensor 212. In some embodiments, the dome temperature sensor 212 may be used in place of the discharge line temperature sensor 154. For example, the discharge line temperature sensor 154 may typically be located on a tubing or the discharge line 157 connecting the compressor 136 to a reversing valve, such as the four-way valve 138, or condenser, such as the indoor heat exchanger 116, while the dome temperature sensor 212 may be located on top or a surface of the compressor shell. Both the discharge temperature sensor 154 and the dome temperature sensor 212 may be used to sense the temperature of the refrigerant leaving the compressor 136. In any case, the control board 82 may ensure that the discharge temperature sensor information and/or the preferable dome temperature sensor information are below a threshold temperature to protect the oil and/or the scroll set of the compressor 136.

As yet another example, when the HVAC system 110 is protecting an evaporator coil, such as 116, 130, from freezing, the control board 82 may use the suction temperature sensor information provided by the suction line temperature sensor 148 or indoor suction temperature sensor information provided by an indoor suction temperature sensor, such as the indoor temperature sensor 122. In particular, the indoor suction temperature sensor may be located at an outlet of the indoor heat exchanger 116, which may be operating as an evaporator when operating in a cooling mode. The outlet of the indoor heat exchanger 116 may typically be a copper tube connecting the indoor unit 112 to the outdoor unit 114 that functions as a suction or return gas line.

The control board 82 may use the suction temperature sensor information from the suction line temperature sensor 148 when the HVAC system 110 is heating the building and determine whether the suction temperature sensor information is below a threshold that is indicative of a frosting or freezing outdoor coil.

Similarly, the control board 82 may use the indoor suction temperature sensor information from the indoor suction temperature sensor, such as the indoor temperature sensor 122, when the HVAC system 110 is cooling the building and determine whether the indoor suction temperature sensor information is below a threshold that is indicative of a frosting or freezing coil. Additionally or alternatively, the control board 82 may use feedback information from the indoor blower 118, such as indoor blower speed information provided by the blower sensor 119. In particular, the control board 82 may use the indoor blower speed information to determine increased current draw, power draw, and/or low or different blower speed indicative of a frosting or freezing coil.

It should be understood that any suitable feedback information from the indoor blower 118 may be used to determine increased current draw, power draw, and/or low or different fan speed indicative of a frosting or freezing coil, such as current information, voltage information, power information, and the like, of the indoor blower 118. In any case, by performing the process 200 in this manner, the HVAC system 110 may restore functionality and/or operate at reduced functionality when a suction pressure sensor fault is encountered, which, at least in some instances, may facilitate improving operational reliability, availability, and/or lifespan of the HVAC system 110.

Figure 8:
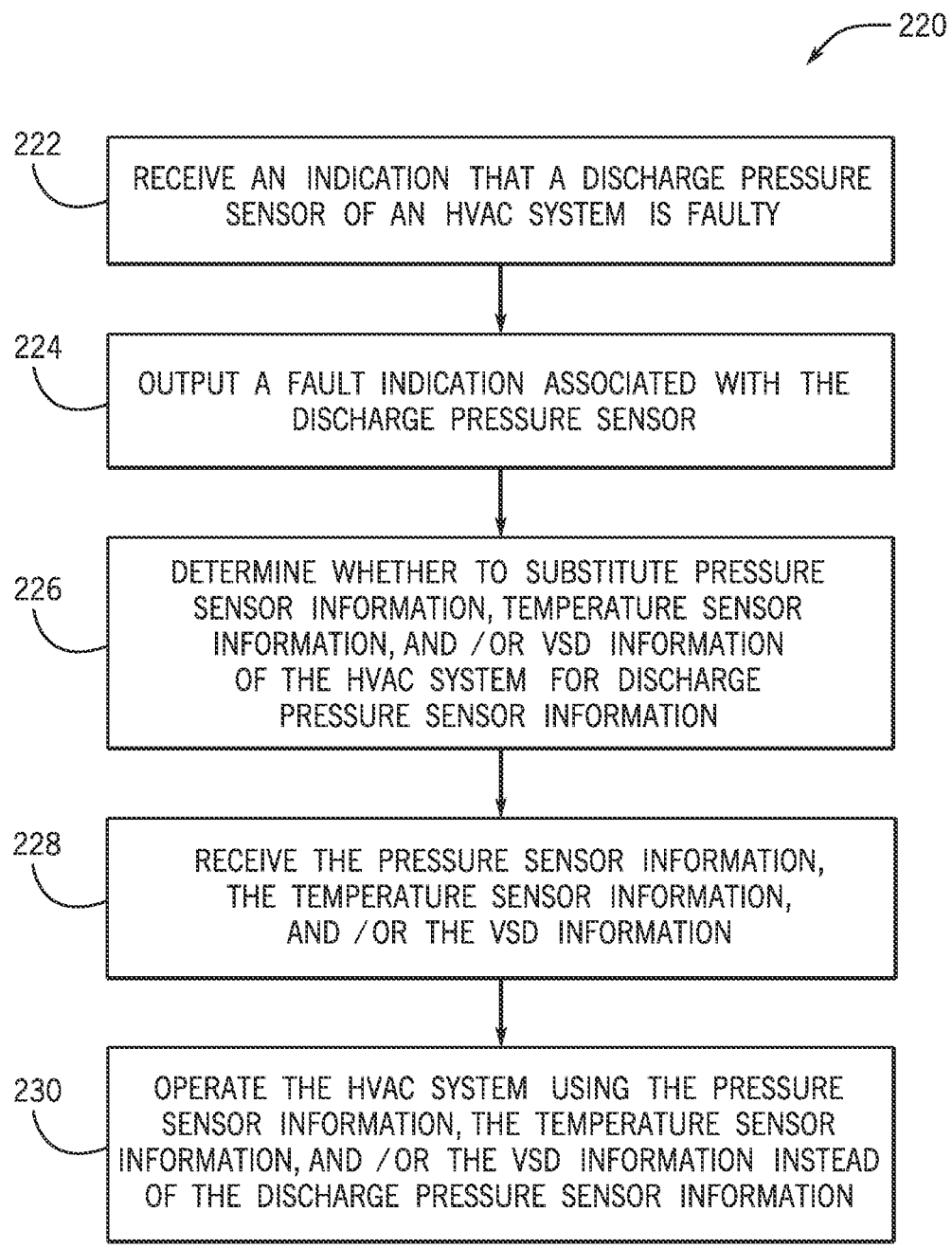
FIG. 8 is a flow diagram of a process for restoring functionality to the HVAC system of FIG. 5 and/or operating the HVAC system of FIG. 5 at reduced functionality when encountering a discharge pressure sensor fault, in accordance with an embodiment of the present disclosure.

FIG. 8 is a flow diagram of a process 220 for restoring functionality to the HVAC system 110 and/or operating the HVAC system 110 at reduced functionality when encountering a discharge pressure sensor fault, in accordance with an embodiment of the present disclosure. The process 220 may be performed by any suitable device that may receive an indication that the discharge line pressure sensor 156 of the HVAC system 110 is faulty, determine alternative information to substitute for the faulty discharge line pressure sensor 156, and operate the HVAC system 110 using the alternative sensor information. While the process 220 is described using steps in a specific sequence, it should be understood that the present disclosure contemplates that the described steps may be performed in different sequences than the sequence illustrated, and certain described steps may be skipped or not performed altogether. In some embodiments, the process 220 may be implemented by executing instructions stored in a tangible, non-transitory, computer-readable medium, such as the non-volatile memory 88, using a processor, such as the microprocessor 86.

As illustrated, the control board 82 may receive, at process block 222, an indication that a discharge line pressure sensor 156 of an HVAC system 110 is faulty. In particular, the control board 82 may determine that sensor information sent by the faulty discharge line pressure sensor 156 and received by the control board 82 is inaccurate or not being sent. In some cases, the control board 82 may determine that sensor information sent by the discharge line pressure sensor 156 is inaccurate when it is outside a range of acceptable discharge pressure sensor values.

The control board 82 may then output, at process block 224, a fault indication associated with the discharge line pressure sensor 156. For example, the control board 82 may provide an alert or message to the user interface 91 to inform a user of the faulty discharge line pressure sensor 156. In some embodiments, the fault indication may be provided via the communication interface 92 to the user interface 91 of a user's mobile device.

The control board 82 may determine, at process block 226, to use pressure sensor information, temperature sensor information, and/or VSD information of the HVAC system 110 to substitute for discharge pressure sensor information. The control board 82 may determine what information to use based on the operation to be performed by the HVAC system 110. The control board 82 may then receive, at process block 228, the pressure sensor information, the temperature sensor information, and/or the VSD information, and operate, at process block 230, the HVAC system 110 using the pressure sensor information, the temperature sensor information, and/or the VSD information instead of the discharge pressure sensor information.

For example, when the HVAC system 110 is protecting itself from high pressure conditions, the control board 82 may use an indoor pressure sensor information provided by an indoor pressure sensor, such as the indoor pressure sensor 124. In particular, the control board 82 may substitute the indoor pressure sensor information for pressure sensor information typically received from the discharge line pressure sensor 156.

As another example, when the HVAC system 110 is protecting an envelope limit by controlling the outdoor fan 132 to cool the building, the control board 82 may use discharge temperature sensor information provided by the discharge line temperature sensor 154. In particular, the control board 82 may estimate pressure information based on inferring superheat information from the discharge temperature sensor information provided by the discharge line temperature sensor 154. The estimated pressure information may then be used to protect the envelope limit by controlling the outdoor fan 132. Additionally or alternatively, the control board 82 may use VSD information from the VSD 93 to protect the envelope limit. For example, the control board 82 may use the frequency and/or the voltage output by the VSD 93 to the motor 94 to protect the envelope limit. In some embodiments, the control board 82 may use the resulting alternating current speed and/or the torque of the motor 94 resulting from applying the frequency and/or the voltage output by the VSD 93 to protect the envelope limit.

As yet another example, when the HVAC system 110 is protecting the envelope limit by controlling the indoor blower 118 to heat the building, the control board 82 may use the discharge temperature sensor information provided by the discharge line temperature sensor 154. In particular, the control board 82 may estimate pressure information based on inferring superheat information from the discharge temperature sensor information provided by the discharge line temperature sensor 154. The estimated pressure information may then be used to protect the envelope limit by controlling the indoor blower 118. Additionally or alternatively, the control board 82 may use VSD information from the VSD 93 to protect the envelope limit. For example, the control board 82 may use the frequency and/or the voltage output by the VSD 93 to the motor 94 to protect the envelope limit. In some embodiments, the control board 82 may use the resulting alternating current speed and/or the torque of the motor 94 resulting from applying the frequency and/or the voltage output by the VSD 93 to protect the envelope limit.

As another example, when the HVAC system 110 is protecting scroll set of the compressor 136, the control board 82 may use discharge temperature sensor information provided by the discharge line temperature sensor 154 and/or preferable dome temperature sensor information provided by the dome temperature sensor 212. In particular, the control board 82 may ensure that the discharge temperature sensor information and/or the preferable dome temperature sensor information are above a threshold temperature that prevents liquid floodback.

As yet another example, when the HVAC system 110 is ensuring a charge level, the control board 82 may use liquid pressure sensor information provided by the liquid pressure sensor 142. In particular, the control board 82 may use the liquid pressure sensor information to infer the charge level based on discharge limit and/or superheat information derived from the liquid pressure sensor information. That is, if the liquid pressure sensor information indicates an elevated discharge limit and/or high superheat information, then the control board 82 may determine that the HVAC system 110 has a low charge level. In any case, by performing the process 220 in this manner, the HVAC system 110 may restore functionality and/or operate at reduced functionality when a discharge pressure sensor fault is encountered, which, at least in some instances, may facilitate improving operational reliability, availability, and/or lifespan of the HVAC system 110.

Figure 9:
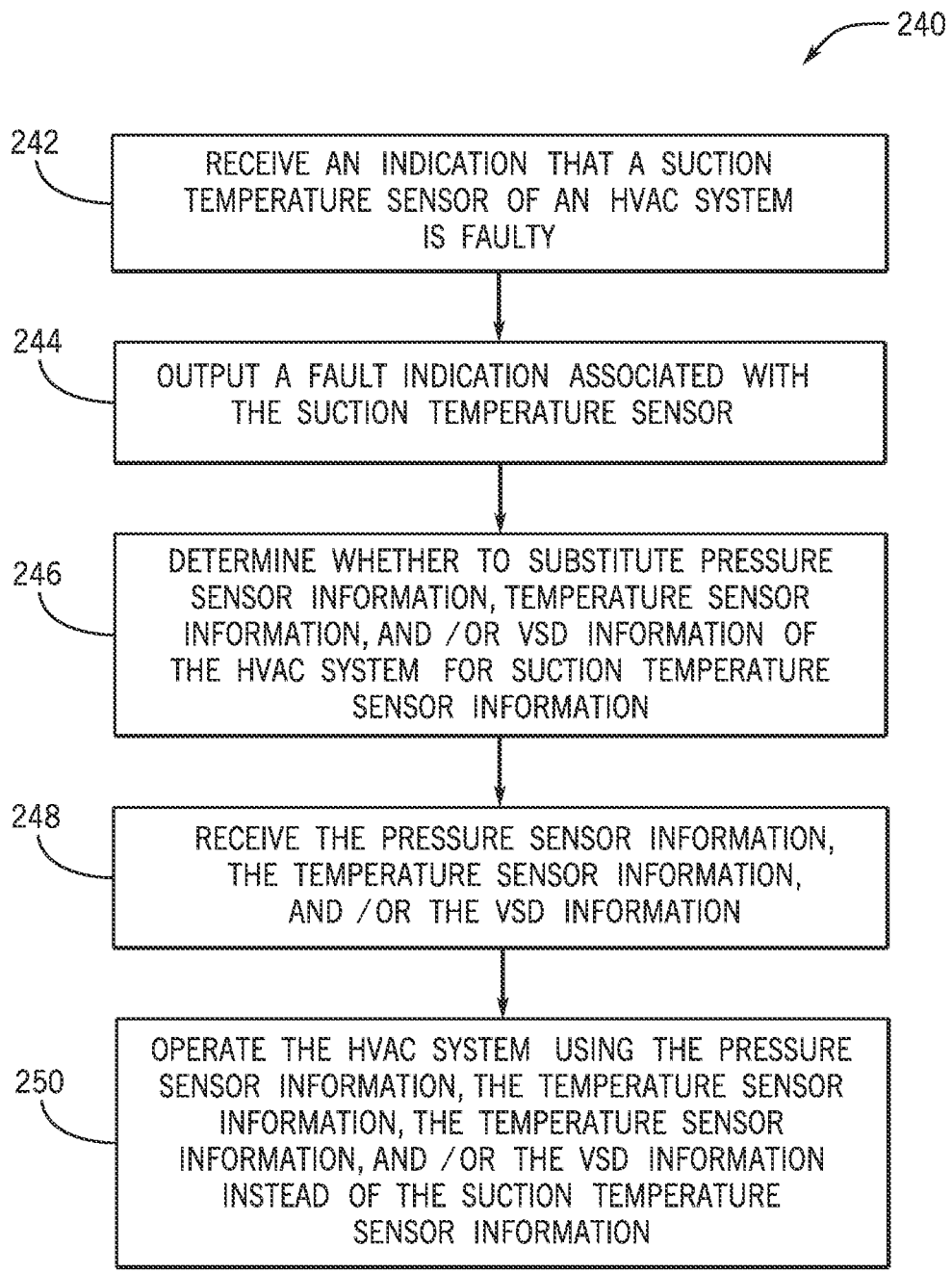
FIG. 9 is a flow diagram of a process for restoring functionality to the HVAC system of FIG. 5 and/or operating the HVAC system of FIG. 5 at reduced functionality when encountering a suction temperature sensor fault, in accordance with an embodiment of the present disclosure.

FIG. 9 is a flow diagram of a process 240 for restoring functionality to the HVAC system 110 and/or operating the HVAC system 110 at reduced functionality when encountering a suction temperature sensor fault, in accordance with an embodiment of the present disclosure. The process 240 may be performed by any suitable device that may receive an indication that the suction line temperature sensor 148 of the HVAC system 110 is faulty, determine alternative information to substitute for the faulty suction temperature sensor 148, and operate the HVAC system 110 using the alternative sensor information. While the process 220 is described using steps in a specific sequence, it should be understood that the present disclosure contemplates that the described steps may be performed in different sequences than the sequence illustrated, and certain described steps may be skipped or not performed altogether. In some embodiments, the process 240 may be implemented by executing instructions stored in a tangible, non-transitory, computer-readable medium, such as the non-volatile memory 88, using a processor, such as the microprocessor 86.

As illustrated, the control board 82 may receive, at process block 242, an indication that a suction line temperature sensor 148 of an HVAC system 110 is faulty. In particular, the control board 82 may determine that sensor information sent by the faulty suction line temperature sensor 148 and received by the control board 82 is inaccurate or not being sent. In some cases, the control board 82 may determine that sensor information sent by the suction line temperature sensor 148 is inaccurate when it is outside a range of acceptable suction temperature sensor values.

The control board 82 may then output, at process block 244, a fault indication associated with the suction temperature sensor 148. For example, the control board 82 may provide an alert or message to the user interface 91 to inform a user of the faulty suction temperature sensor 148. In some embodiments, the fault indication may be provided via the communication interface 92 to the user interface 91 of a user's mobile device.

The control board 82 may determine, at process block 246, to use pressure sensor information, temperature sensor information, and/or VSD information of the HVAC system 110 to substitute for suction temperature sensor information. The control board 82 may determine what information to use based on the operation to be performed by the HVAC system 110. The control board 82 may then receive, at process block 248, the pressure sensor information, the temperature sensor information, and/or the VSD information, and operate, at process block 250, the HVAC system 110 using the pressure sensor information, the temperature sensor information, and/or the VSD information instead of the suction temperature sensor information.

For example, when the HVAC system 110 is controlling the expansion valve 120 to heat a building, the control board 82 may use discharge pressure sensor information provided by the discharge line pressure sensor 156 and discharge temperature sensor information provided by the discharge line temperature sensor 154. In particular, the control board 82 may calculate discharge superheat information using the discharge pressure sensor information and the discharge temperature sensor information. The control board 82 may control the expansion valve 120 to heat the building by ensuring that the calculated discharge superheat information is above a threshold that indicates liquid floodback. Additionally or alternatively, the control board 82 may use coil inlet temperature sensor information, such as outdoor coil temperature sensor information provided by the outdoor coil temperature sensor 144. In particular, the control board 82 may substitute the outdoor coil temperature sensor information for the suction temperature sensor information to control the expansion valve 120 to heat the building.

As another example, when the HVAC system 110 is protecting scroll set of the compressor 136 to limit floodback, the control board 82 may use discharge temperature sensor information provided by the discharge line temperature sensor 154 and/or preferable dome temperature sensor information. In particular, the control board 82 may ensure that the discharge temperature sensor information and/or the preferable dome temperature sensor information are above a threshold temperature that prevents liquid floodback. Additionally or alternatively, the control board 82 may use VSD information from the VSD 93 to protect scroll set of the compressor 136 to limit floodback. For example, the control board 82 may use the frequency and/or the voltage output by the VSD 93 to the motor 94 to protect the scroll set of the compressor 136 to limit floodback. In some embodiments, the control board 82 may use the resulting alternating current speed and/or the torque of the motor 94 resulting from applying the frequency and/or the voltage output by the VSD 93 to protect the scroll set of the compressor 136 to limit floodback. In any case, by performing the process 240 in this manner, the HVAC system 110 may restore functionality and/or operate at reduced functionality when a suction temperature sensor fault is encountered, which, at least in some instances, may facilitate improving operational reliability, availability, and/or lifespan of the HVAC system 110.

Figure 10:
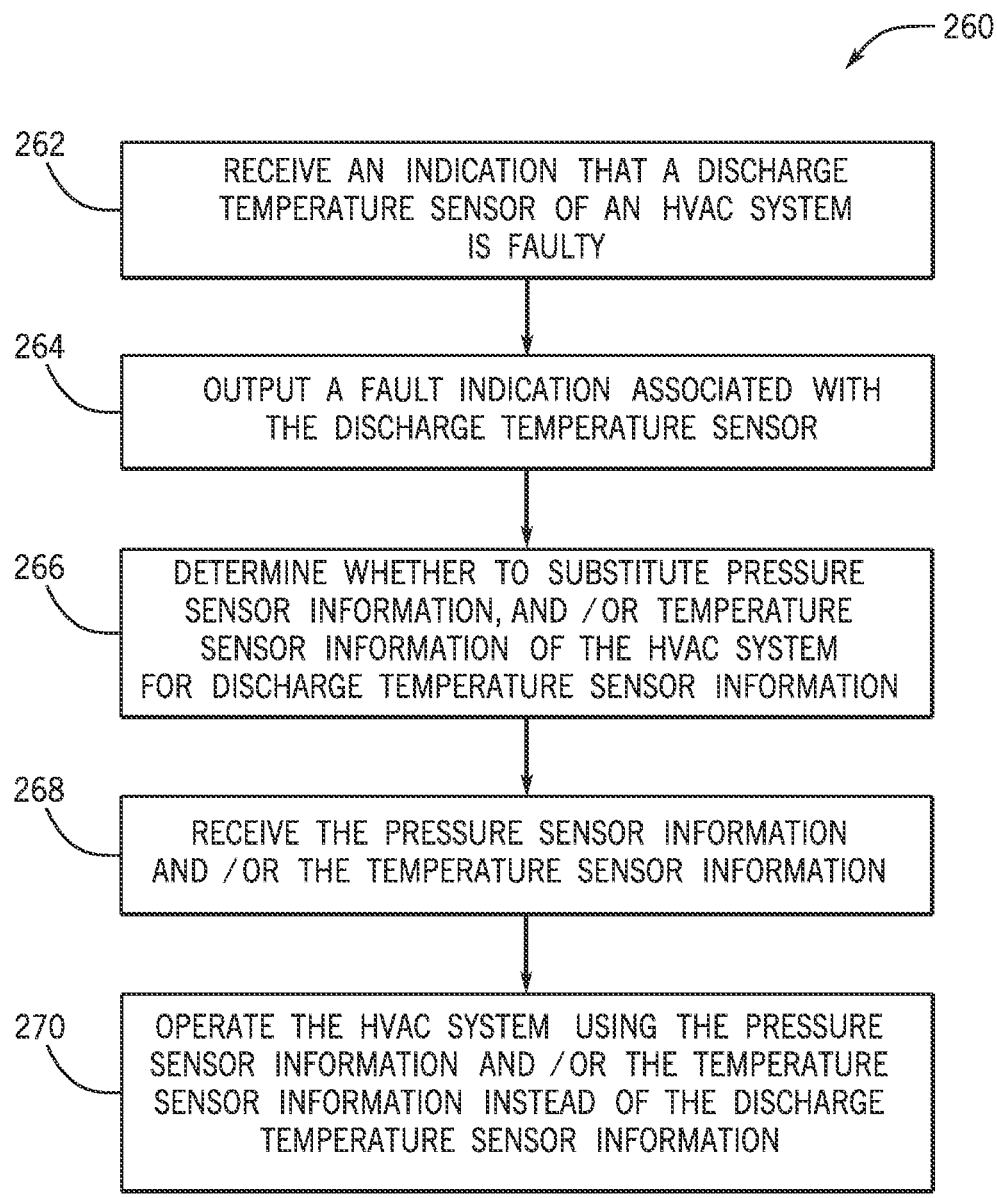
FIG. 10 is a flow diagram of a process for restoring functionality to the HVAC system of FIG. 5 and/or operating the HVAC system of FIG. 5 at reduced functionality when encountering a discharge temperature sensor fault, in accordance with an embodiment of the present disclosure.

FIG. 10 is a flow diagram of a process 260 for restoring functionality to the HVAC system 110 and/or operating the HVAC system 110 at reduced functionality when encountering a discharge temperature sensor fault, in accordance with an embodiment of the present disclosure. The process 260 may be performed by any suitable device that may receive an indication that the discharge line temperature sensor 154 of the HVAC system 110 is faulty, determine alternative information to substitute for the faulty discharge line temperature sensor 154, and operate the HVAC system 110 using the alternative sensor information. While the process 260 is described using steps in a specific sequence, it should be understood that the present disclosure contemplates that the described steps may be performed in different sequences than the sequence illustrated, and certain described steps may be skipped or not performed altogether. In some embodiments, the process 260 may be implemented by executing instructions stored in a tangible, non-transitory, computer-readable medium, such as the non-volatile memory 88, using a processor, such as the microprocessor 86.

As illustrated, the control board 82 may receive, at process block 262, an indication that a discharge line temperature sensor 154 of an HVAC system 110 is faulty. In particular, the control board 82 may determine that sensor information sent by the faulty discharge line temperature sensor 154 and received by the control board 82 is inaccurate or not being sent. In some cases, the control board 82 may determine that sensor information sent by the discharge line temperature sensor 154 is inaccurate when it is outside a range of acceptable discharge temperature sensor values.

The control board 82 may then output, at process block 264, a fault indication associated with the discharge line temperature sensor 154. For example, the control board 82 may provide an alert or message to the user interface 91 to inform a user of the faulty discharge line temperature sensor 154. In some embodiments, the fault indication may be provided via the communication interface 92 to the user interface 91 of a user's mobile device.

The control board 82 may determine, at process block 266, to use pressure sensor information and/or temperature sensor information of the HVAC system 110 to substitute for discharge temperature sensor information. The control board 82 may determine what information to use based on the operation to be performed by the HVAC system 110. The control board 82 may then receive, at process block 268, the pressure sensor information and/or the temperature sensor information, and operate, at process block 270, the HVAC system 110 using the pressure sensor information and/or the temperature sensor information instead of the discharge temperature sensor information.

For example, when the HVAC system 110 is protecting oil and/or scroll set of the compressor 136, the control board 82 may use discharge pressure sensor information provided by the discharge line pressure sensor 156 and/or suction pressure sensor information provided by the suction line pressure sensor 150. In particular, the control board 82 may use the discharge pressure sensor information and/or the suction pressure sensor information to ensure that the compressor 136 is operating within an operating envelope. In some embodiments, the operating envelope may be reduced at high lift conditions to ensure that the subsequent discharge temperature is not excessive. Additionally or alternatively, when the HVAC system 110 is heating the building, the control board 82 may use indoor temperature sensor information, which may be provided by an indoor temperature sensor, such as the evaporator temperature sensor 122 or the indoor coil sensor 128, to infer temperature of gas leaving the compressor 136. In any case, by performing the process 260 in this manner, the HVAC system 110 may restore functionality and/or operate at reduced functionality when a discharge temperature sensor fault is encountered, which, at least in some instances, may facilitate improving operational reliability, availability, and/or lifespan of the HVAC system 110.

Figure 11:
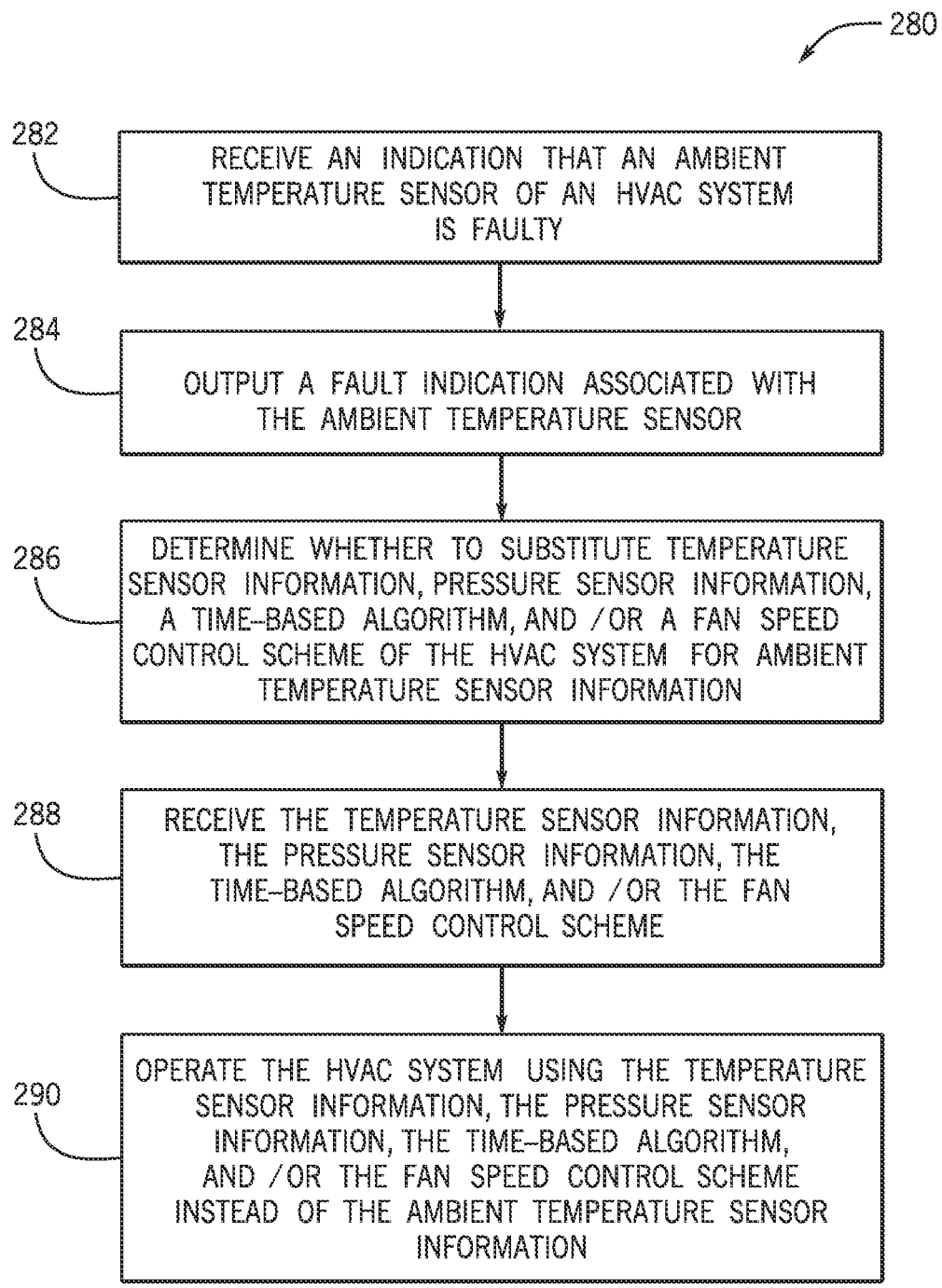
FIG. 11 is a flow diagram of a process for restoring functionality to the HVAC system of FIG. 5 and/or operating the HVAC system of FIG. 5 at reduced functionality when encountering an ambient temperature sensor fault, in accordance with an embodiment of the present disclosure.

FIG. 11 is a flow diagram of a process 280 for restoring functionality to the HVAC system 110 and/or operating the HVAC system 110 at reduced functionality when encountering an ambient temperature sensor fault, in accordance with an embodiment of the present disclosure. The process 280 may be performed by any suitable device that may receive an indication that the ambient temperature sensor 140 of the HVAC system 110 is faulty, determine alternative information to substitute for the faulty ambient temperature sensor 140, and operate the HVAC system 110 using the alternative sensor information. While the process 280 is described using steps in a specific sequence, it should be understood that the present disclosure contemplates that the described steps may be performed in different sequences than the sequence illustrated, and certain described steps may be skipped or not performed altogether. In some embodiments, the process 280 may be implemented by executing instructions stored in a tangible, non-transitory, computer-readable medium, such as the non-volatile memory 88, using a processor, such as the microprocessor 86.

As illustrated, the control board 82 may receive, at process block 282, an indication that an ambient temperature sensor 140 of an HVAC system 110 is faulty. In particular, the control board 82 may determine that sensor information sent by the faulty ambient temperature sensor 140 and received by the control board 82 is inaccurate or not being sent. In some cases, the control board 82 may determine that sensor information sent by the ambient temperature sensor 140 is inaccurate when it is outside a range of acceptable ambient temperature sensor values.

The control board 82 may then output, at process block 284, a fault indication associated with the ambient temperature sensor 140. For example, the control board 82 may provide an alert or message to the user interface 91 to inform a user of the faulty ambient temperature sensor 154. In some embodiments, the fault indication may be provided via the communication interface 92 to the user interface 91 of a user's mobile device.

The control board 82 may determine, at process block 286, to use temperature sensor information, pressure sensor information, a time-based algorithm, and/or a fan speed control scheme of the HVAC system 110 to substitute for ambient temperature sensor information. The control board 82 may determine what information to use based on the operation to be performed by the HVAC system 110. The control board 82 may then receive, at process block 288, the temperature sensor information, the pressure sensor information, the time-based algorithm, and/or the fan speed control scheme, and operate, at process block 270, the HVAC system 110 using the temperature sensor information, the pressure sensor information, the time-based algorithm, and/or the fan speed control scheme, instead of the ambient temperature sensor information.

For example, when the HVAC system 110 is defrosting when heating the building, the control board 82 may use temperature sensor information provided by the communication interface 92. In particular, the control board 82 may receive the temperature sensor information from a communication network, such as the Internet, via the communication interface 92. The temperature sensor information may correspond to a geographical location, such as a zip code, city, state, and the like, of where the HVAC system 110 is disposed. The control board 82 may then substitute the temperature sensor information for ambient temperature sensor information typically received from the ambient temperature sensor 140.

Additionally or alternatively, the control board 82 may use an algorithm that determines whether suction pressure and/or suction temperature is below a threshold value after a defrost cycle instead of using the ambient temperature sensor 140. As such, the algorithm may be based on suction pressure sensor information provided by the suction line pressure sensor 150 and/or suction temperature sensor information provided by the suction temperature sensor 148. For example, the algorithm may include assuming that a coil of a heat exchanger is frost free after the defrost cycle. If, after a duration of time, the control board 82 determines that the suction pressure sensor information provided by the suction line pressure sensor 150 is below a threshold value, e.g., after an hour the suction pressure decreases more than 10 pounds per square inch, then the control board 82 may defrost the coil—without using the ambient temperature sensor 140.

As another example, the control board 82 may use a periodic defrost algorithm to control the HVAC system 110. For example, the control board 82 may operate the HVAC system 110 normally for a duration of time, such as thirty minutes, an hour, or the like, and then execute a defrost cycle for a duration of time, such as fifteen minutes, thirty minutes, and the like, and then repeat.

In some instances, the HVAC system 110 may transition from one side of a balance point to another. The balance point may refer to when a heat pump's output equals the heating needs of the building. Below the balance point, supplementary heating, such as electric resistance heating, may be used. When the HVAC system 110 transitions from one side of the balance point to another, the control board 82 may use temperature sensor information provided by the communication interface 92. The control board 82 may then substitute the temperature sensor information for the ambient temperature sensor information typically received from the ambient temperature sensor 140.

Additionally or alternatively, the control board 82 may shut down at least some components of the HVAC system 110 to enable the components to rest for a duration of time. During this time, temperature sensor information provided by an outdoor temperature sensor, such as the suction line temperature sensor 148, the discharge line temperature sensor 154, and/or the outdoor coil temperature sensor 144, may be used in place of the ambient temperature sensor 140. In such embodiments, the control board 82 may apply an offset to the temperature sensor information to more closely match the ambient temperature sensor information typically received from the ambient temperature sensor 140. Additionally or alternatively, the control board 82 may use coil temperature sensor information provided by the outdoor coil temperature sensor 144 to infer an ambient temperature. In such an embodiment, if the coil temperature sensor information falls below a threshold temperature, such as 38° F., for example, the control board 82 may lock the HVAC system 110 and notify a user. In some embodiments, the control board 82 may determine and/or estimate the temperature sensor information based on other sensor information, such as pressure sensor information. For example, the control board 82 may determine saturated suction temperature based on pressure sensor information provided by the suction line pressure sensor 150. In such an example, the HVAC system 110 may not be operating or may have been at rest for a time period, and, as such, the refrigerant may reach equilibrium with surrounding or ambient conditions.

The refrigerant pressure measured by the suction line pressure sensor 150 may be used with conversion tables to determine the saturated suction temperature of the refrigerant. The saturated suction temperature may approximately match the ambient temperature of the surroundings.

In some instances, the HVAC system 110 may use the ambient temperature sensor information typically received from the ambient temperature sensor 140 to determine low temperature conditions to avoid overcooling and/or icing, for example, the outdoor coil 144 and/or pipes or other components of the outdoor unit 114. As such, the control board 82 may instead use temperature sensor information provided by the communication interface 92. That is, the control board 82 may substitute the temperature sensor information for the ambient temperature sensor information typically received from the ambient temperature sensor 140.

Additionally or alternatively, the control board 82 may shut down at least some components of the HVAC system 110 to enable the components to rest for a duration of time. During this time, temperature sensor information provided by an outdoor temperature sensor, such as the suction temperature sensor 148, the discharge line temperature sensor 154, the outdoor coil temperature sensor 144, and/or a saturated suction temperature sensor, may be used in place of the ambient temperature sensor 140. In such embodiments, the control board 82 may apply an offset to the temperature sensor information to more closely match the ambient temperature sensor information typically received from the ambient temperature sensor 140. Additionally or alternatively, the control board 82 may use coil temperature sensor information provided by the outdoor coil temperature sensor 144 to infer an ambient temperature. In such an embodiment, if the coil temperature sensor information falls below a threshold temperature, such as 38° F., for example, the control board 82 may lock the HVAC system 110 and notify the user.

In another example, when the HVAC system 110 is controlling speed of the compressor 136, the control board 82 may use temperature sensor information provided by the communication interface 92. That is, the control board 82 may substitute the temperature sensor information for the ambient temperature sensor information typically received from the ambient temperature sensor 140.

Additionally or alternatively, the control board 82 may shut down at least some components of the HVAC system 110 to enable the components to rest for a duration of time. During this time, temperature sensor information provided by an outdoor temperature sensor, such as the suction temperature sensor 148, the discharge line temperature sensor 154, the outdoor coil temperature sensor 144, and/or a saturated suction temperature sensor, may be used in place of the ambient temperature sensor 140. In such embodiments, the control board 82 may apply an offset to the temperature sensor information to more closely match the ambient temperature sensor information typically received from the ambient temperature sensor 140. Additionally or alternatively, the control board 82 may use coil temperature sensor information provided by the outdoor coil temperature sensor 144 to infer an ambient temperature. In such embodiments, if the coil temperature sensor information falls below a threshold temperature, such as 38° F., for example, the control board 82 may lock the HVAC system 110 and notify the user.

In yet another example, when the HVAC system 110 is limiting airflow of the indoor blower 118, the control board 82 may use temperature sensor information provided by the communication interface 92. That is, the control board 82 may substitute the temperature sensor information for the ambient temperature sensor information typically received from the ambient temperature sensor 140.

Additionally or alternatively, the control board 82 may shut down at least some components of the HVAC system 110 to enable the components to rest for a duration of time. During this time, temperature sensor information provided by an outdoor temperature sensor, such as the suction temperature sensor 148, the discharge line temperature sensor 154, the outdoor coil temperature sensor 144, and/or a saturated suction temperature sensor, may be used in place of the ambient temperature sensor 140. In such embodiments, the control board 82 may apply an offset to the temperature sensor information to more closely match the ambient temperature sensor information typically received from the ambient temperature sensor 140. Additionally or alternatively, the control board 82 may use coil temperature sensor information provided by the outdoor coil temperature sensor 144 to infer an ambient temperature. In such embodiments, if the coil temperature sensor information falls below a threshold temperature, such as 38° F., for example, the control board 82 may lock the HVAC system 110 and notify the user. In some embodiments, the control board 82 may use the coil temperature sensor information to determine a speed range that the indoor blower 118 is allowed to operate.

In another example, when the HVAC system 110 is controlling speed of the outdoor fan 132, the control board 82 may use temperature sensor information provided by the communication interface 92. That is, the control board 82 may substitute the temperature sensor information for the ambient temperature sensor information typically received from the ambient temperature sensor 140.

Additionally or alternatively, the control board 82 may shut down at least some components of the HVAC system 110 to enable the components to rest for a duration of time. During this time, temperature sensor information provided by an outdoor temperature sensor, such as the suction temperature sensor 148, the discharge line temperature sensor 154, the outdoor coil temperature sensor 144, and/or a saturated suction temperature sensor, may be used in place of the ambient temperature sensor 140. In such embodiments, the control board 82 may apply an offset to the temperature sensor information to more closely match the ambient temperature sensor information typically received from the ambient temperature sensor 140. Additionally or alternatively, the control board 82 may use coil temperature sensor information provided by the outdoor coil temperature sensor 144 to infer an ambient temperature. In such embodiments, if the coil temperature sensor information falls below a threshold temperature, such as 38° F., for example, the control board 82 may lock the HVAC system 110 and notify the user.

In some embodiments, the control board 82 may use the coil temperature sensor information to determine a speed range that the outdoor fan 132 is allowed to operate. The control board 82 may also or alternatively use a fan control scheme, such as setting the outdoor fan 132 to run at full speed, when the control board 82 receives an instruction to operate the outdoor fan 132, instead of basing control of the speed of the outdoor fan 132 on the ambient temperature sensor information. In any case, by performing the process 280 in this manner, the HVAC system 110 may restore functionality and/or operate at reduced functionality when an ambient temperature sensor fault is encountered, which, at least in some instances, may facilitate improving operational reliability, availability, and/or lifespan of the HVAC system 110.

Figure 12:
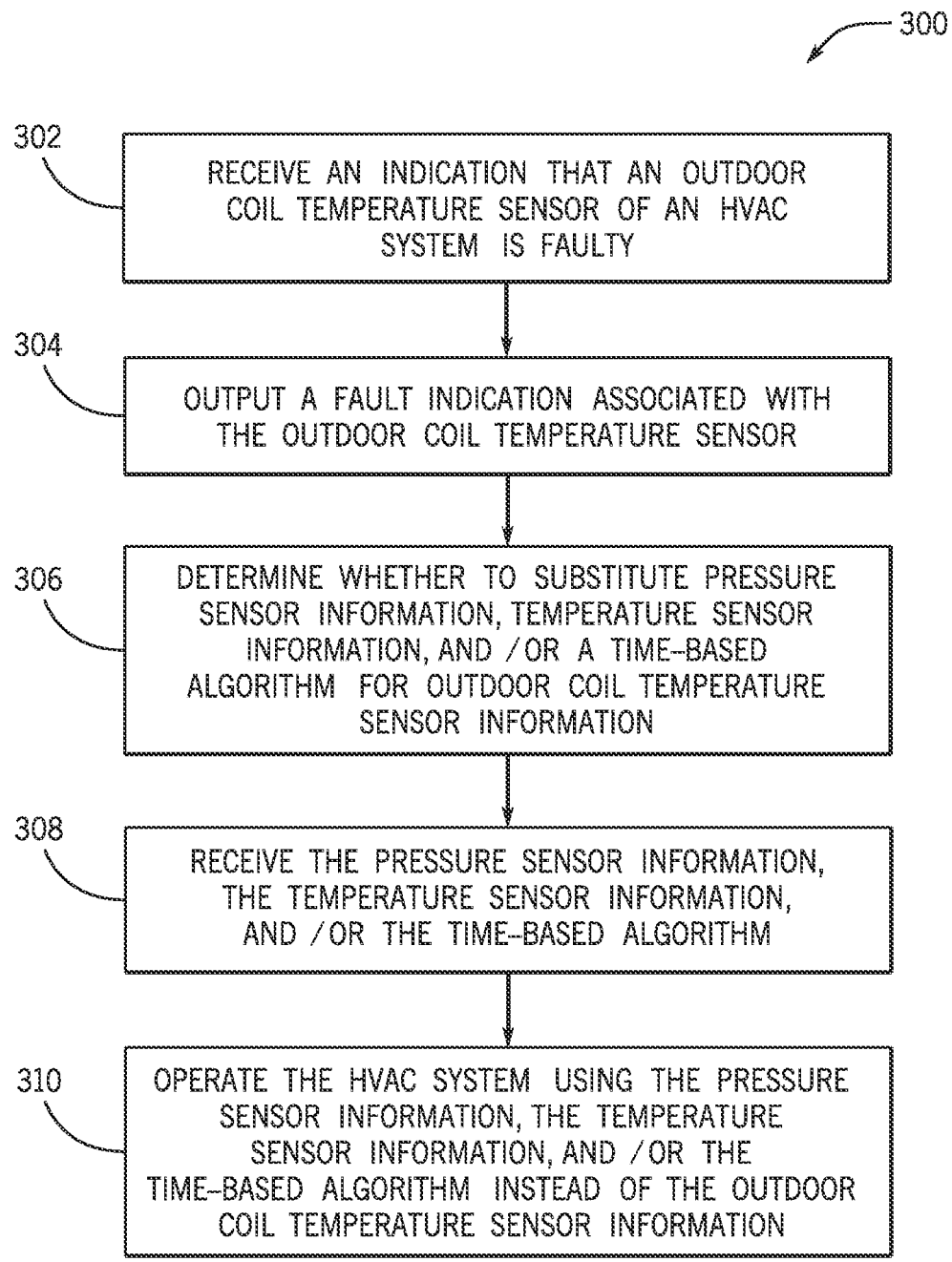
FIG. 12 is a flow diagram of a process for restoring functionality to the HVAC system of FIG. 5 and/or operating the HVAC system of FIG. 5 at reduced functionality when encountering an outdoor coil temperature sensor fault, in accordance with an embodiment of the present disclosure.

FIG. 12 is a flow diagram of a process 300 for restoring functionality to the HVAC system 110 and/or operating the HVAC system 110 at reduced functionality when encountering an outdoor coil temperature sensor fault, in accordance with an embodiment of the present disclosure. The process 300 may be performed by any suitable device that may receive an indication that the outdoor coil temperature sensor 144 of the HVAC system 110 is faulty, determine alternative information to substitute for the faulty outdoor coil temperature sensor 144, and operate the HVAC system 110 using the alternative sensor information. While the process 300 is described using steps in a specific sequence, it should be understood that the present disclosure contemplates that the described steps may be performed in different sequences than the sequence illustrated, and certain described steps may be skipped or not performed altogether. In some embodiments, the process 300 may be implemented by executing instructions stored in a tangible, non-transitory, computer-readable medium, such as the non-volatile memory 88, using a processor, such as the microprocessor 86.

As illustrated, the control board 82 may receive, at process block 302, an indication that an outdoor coil temperature sensor 144 of an HVAC system 110 is faulty. In particular, the control board 82 may determine that sensor information sent by the faulty outdoor coil temperature sensor 144 and received by the control board 82 is inaccurate or not being sent. In some cases, the control board 82 may determine that sensor information sent by the outdoor coil temperature sensor 144 is inaccurate when it is outside a range of acceptable outdoor coil temperature sensor values.

The control board 82 may then output, at process block 304, a fault indication associated with the outdoor coil temperature sensor 144. For example, the control board 82 may provide an alert or message to the user interface 91 to inform a user of the faulty outdoor coil temperature sensor 144. In some embodiments, the fault indication may be provided via the communication interface 92 to the user interface 91 of a user's mobile device.

The control board 82 may determine, at process block 306, to use pressure sensor information, temperature sensor information, and/or a time-based algorithm of the HVAC system 110 to substitute for outdoor coil temperature sensor information. The control board 82 may determine what information to use based on the operation to be performed by the HVAC system 110. The control board 82 may then receive, at process block 308, the pressure sensor information, the temperature sensor information, and/or the time-based algorithm, and operate, at process block 310, the HVAC system 110 using the pressure sensor information, the temperature sensor information, and/or the time-based algorithm, instead of outdoor coil temperature sensor information.

For example, when the HVAC system 110 is defrosting when heating the building, the control board 82, may use an algorithm that determines whether suction pressure and/or suction temperature is below a threshold value after a defrost cycle instead of using the ambient temperature sensor 140. As such, the algorithm may be based on suction pressure sensor information provided by the suction line pressure sensor 150 and/or suction temperature sensor information provided by the suction temperature sensor 148. For example, the algorithm may include assuming that a coil of a heat exchanger is frost free after the defrost cycle. If, after a duration a time, the control board 82 determines that the suction temperature sensor information provided by the suction line temperature sensor 148 is below a threshold value, e.g., after an hour the suction pressure decreases more than 10 degrees, then the control board 82 may defrost the coil—without using the outdoor coil temperature sensor 144.

Additionally or alternatively, the control board 82 may use a periodic defrost algorithm to control the HVAC system 110 instead of control board 82 may use an algorithm. For example, the control board 82 may operate the HVAC system 110 normally for a duration of time, such as thirty minutes, an hour, or the like, and then execute a defrost cycle for a duration of time, such as fifteen minutes, thirty minutes, and the like, and then repeat. In any case, by performing the process 300 in this manner, the HVAC system 110 may restore functionality and/or operate at reduced functionality when an outdoor coil temperature sensor fault is encountered, which, at least in some instances, may facilitate improving operational reliability, availability, and/or lifespan of the HVAC system 110.

Figure 13:
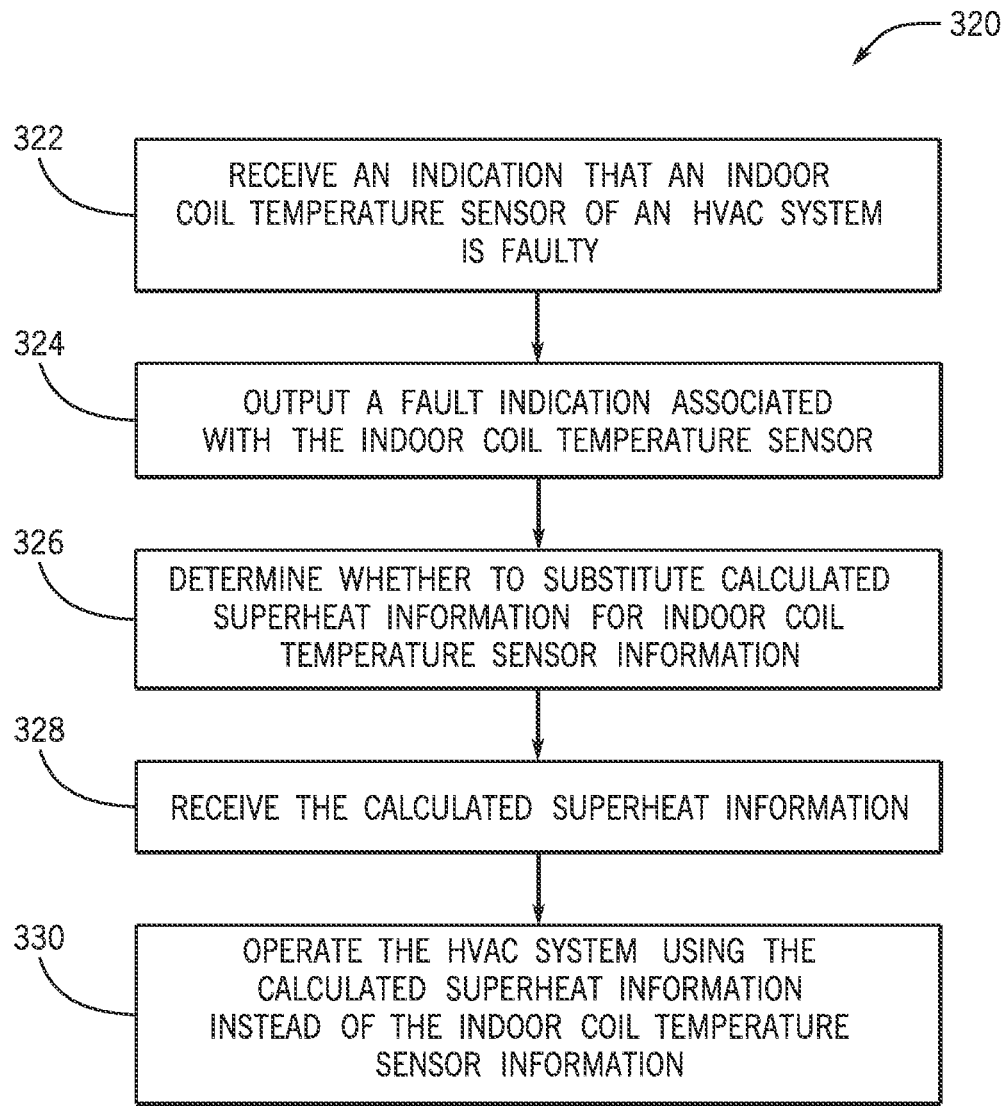
FIG. 13 is a flow diagram of a process for restoring functionality to the HVAC system of FIG. 5 and/or operating the HVAC system of FIG. 5 at reduced functionality when encountering an indoor coil temperature sensor fault, in accordance with an embodiment of the present disclosure.

FIG. 13 is a flow diagram of a process 320 for restoring functionality to the HVAC system 110 and/or operating the HVAC system 110 at reduced functionality when encountering an indoor coil temperature sensor fault, in accordance with an embodiment of the present disclosure. The process 320 may be performed by any suitable device that may receive an indication that the indoor coil sensor 128 of the HVAC system 110 is faulty, determine alternative information to substitute for the faulty indoor coil sensor 128, and operate the HVAC system 110 using the alternative sensor information. While the process 320 is described using steps in a specific sequence, it should be understood that the present disclosure contemplates that the described steps may be performed in different sequences than the sequence illustrated, and certain described steps may be skipped or not performed altogether. In some embodiments, the process 320 may be implemented by executing instructions stored in a tangible, non-transitory, computer-readable medium, such as the non-volatile memory 88, using a processor, such as the microprocessor 86.

As illustrated, the control board 82 may receive, at process block 322, an indication that an indoor coil sensor 128 of an HVAC system 110 is faulty. In particular, the control board 82 may determine that sensor information sent by the faulty indoor coil sensor 128 and received by the control board 82 is inaccurate or not being sent. In some cases, the control board 82 may determine that sensor information sent by the indoor coil sensor 128 is inaccurate when it is outside a range of acceptable indoor coil temperature sensor values.

The control board 82 may then output, at process block 324, a fault indication associated with the indoor coil sensor 128. For example, the control board 82 may provide an alert or message to the user interface 91 to inform a user of the faulty indoor coil sensor 128. In some embodiments, the fault indication may be provided via the communication interface 92 to the user interface 91 of a user's mobile device.

The control board 82 may determine, at process block 326, to use calculated superheat information of the HVAC system 110 as a substitute for indoor coil temperature sensor information based on the operation to be performed by the HVAC system 110. In particular, the control board 82 may use the calculated superheat information when the HVAC system 110 is controlling the expansion valve 134 when cooling the building. The control board 82 may then receive, at process block 328, or calculate the calculated superheat information based on outdoor sensor information, such as outdoor coil temperature sensor information provided by the outdoor coil temperature sensor 144, suction temperature provided by the suction temperature sensor 148, suction pressure sensor information provided by the suction line pressure sensor 150, discharge temperature provided by the discharge line temperature sensor 154, and/or discharge pressure sensor information provided by the discharge line pressure sensor 156.

The control board 82 may operate, at process block 330, the HVAC system 110 using the calculated superheat information, instead of the indoor coil temperature sensor information. In particular, the control board 82 may control the expansion valve 134 using the calculated superheat information, instead of the indoor coil temperature sensor information. In any case, by performing the process 320 in this manner, the HVAC system 110 may restore functionality and/or operate at reduced functionality when an indoor coil temperature sensor fault is encountered, which, at least in some instances, may facilitate improving operational reliability, availability, and/or lifespan of the HVAC system 110.

Figure 14:
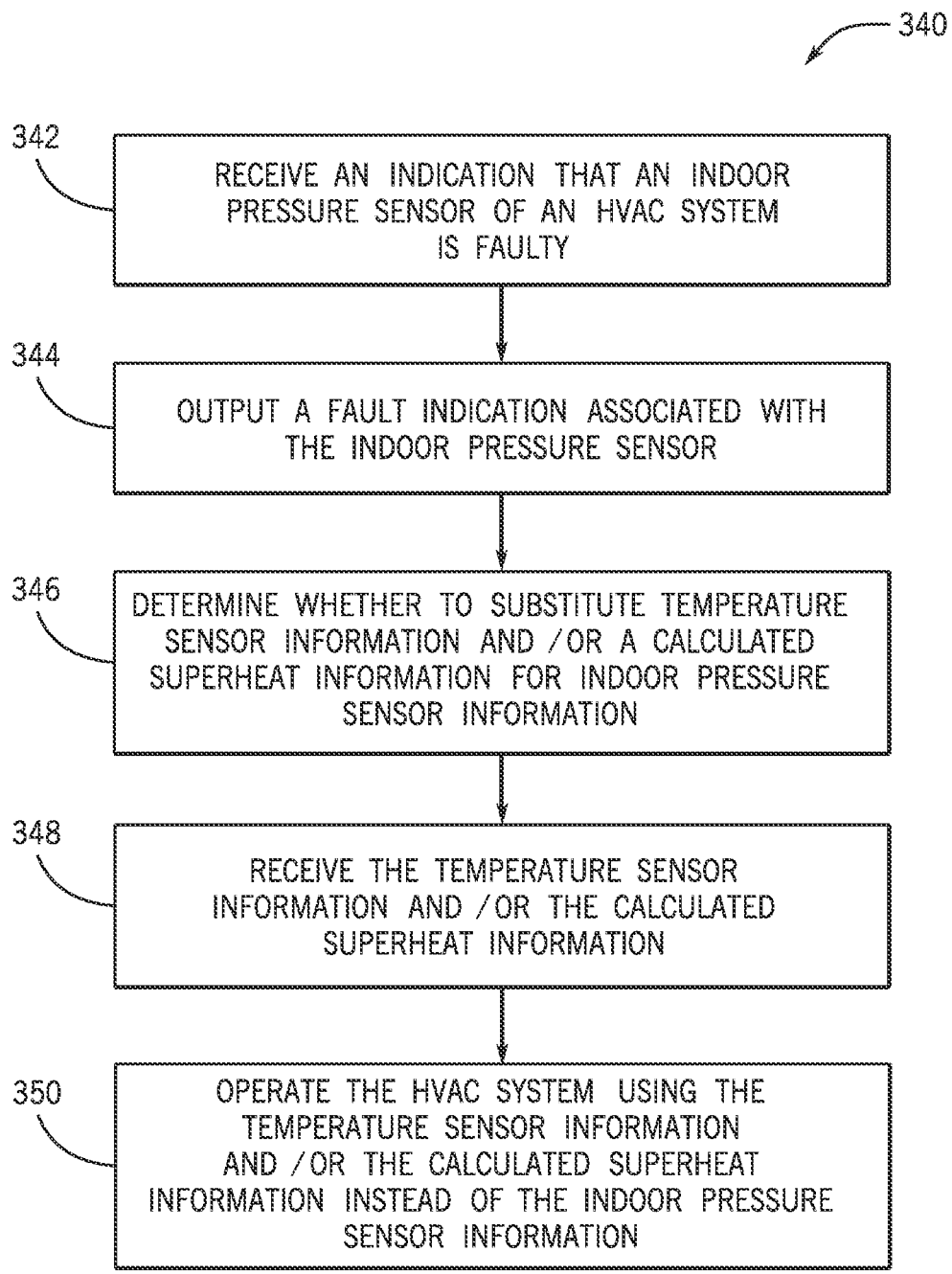
FIG. 14 is a flow diagram of a process for restoring functionality to the HVAC system of FIG. 5 and/or operating the HVAC system of FIG. 5 at reduced functionality when encountering an indoor pressure sensor fault, in accordance with an embodiment of the present disclosure.

FIG. 14 is a flow diagram of a process 340 for restoring functionality to the HVAC system 110 and/or operating the HVAC system 110 at reduced functionality when encountering an indoor pressure sensor fault, in accordance with an embodiment of the present disclosure. The process 340 may be performed by any suitable device that may receive an indication that the indoor pressure sensor of the HVAC system 110 is faulty, determine alternative information to substitute for the faulty indoor pressure sensor, and operate the HVAC system 110 using the alternative sensor information. While the process 340 is described using steps in a specific sequence, it should be understood that the present disclosure contemplates that the described steps may be performed in different sequences than the sequence illustrated, and certain described steps may be skipped or not performed altogether. In some embodiments, the process 340 may be implemented by executing instructions stored in a tangible, non-transitory, computer-readable medium, such as the non-volatile memory 88, using a processor, such as the microprocessor 86.

As illustrated, the control board 82 may receive, at process block 342, an indication that an indoor pressure sensor, such as the indoor pressure sensor 124, of an HVAC system 110 is faulty. In some embodiments, the HVAC system 110 may be operating in a heating mode and the indoor heat exchanger 116 may be operating as a condenser. As such, the indoor pressure sensor 124 may be an indoor condenser pressure sensor. The control board 82 may determine that sensor information sent by the faulty indoor pressure sensor and received by the control board 82 is inaccurate or not being sent. In some cases, the control board 82 may determine that sensor information sent by the indoor pressure sensor is inaccurate when it is outside a range of acceptable indoor pressure sensor values.

The control board 82 may then output, at process block 344, a fault indication associated with the indoor pressure sensor. For example, the control board 82 may provide an alert or message to the user interface 91 to inform a user of the faulty indoor pressure sensor. In some embodiments, the fault indication may be provided via the communication interface 92 to the user interface 91 of a user's mobile device.

The control board 82 may determine, at process block 346, to use temperature sensor information and/or calculated superheat information of the HVAC system 110 to substitute for indoor pressure sensor information. The control board 82 may determine what information to use based on the operation to be performed by the HVAC system 110. The control board 82 may then receive, at process block 348, the temperature sensor information and/or the calculated superheat information, and operate, at process block 350, the HVAC system 110 using the temperature sensor information and/or the calculated superheat information, instead of the indoor pressure sensor information.

For example, when the HVAC system 110 is controlling the expansion valve 134 when cooling the building, the control board 82 may use temperature sensor information provided by a temperature sensor disposed at an entering side of the indoor heat exchanger 116, such as the indoor coil sensor 128. In particular, the control board 82 may use a temperature control algorithm in conjunction with the temperature sensor information to control the expansion valve 134 instead of the indoor pressure sensor information.

Additionally or alternatively, the control board 82 may calculate superheat information of the HVAC system 110 to substitute for the indoor pressure sensor information. In particular, the control board 82 may calculate the calculated superheat information based on outdoor sensor information, such as outdoor coil temperature sensor information provided by the outdoor coil temperature sensor 144, suction temperature provided by the suction temperature sensor 148, suction pressure sensor information provided by the suction line pressure sensor 150, discharge temperature provided by the discharge line temperature sensor 154, and/or discharge pressure sensor information provided by the discharge line pressure sensor 156.

The control board 82 may then control the expansion valve 134 using the calculated superheat information, instead of the indoor pressure sensor information. In any case, by performing the process 340 in this manner, the HVAC system 110 may restore functionality and/or operate at reduced functionality when an indoor pressure sensor fault is encountered, which, at least in some instances, may facilitate improving operational reliability, availability, and/or lifespan of the HVAC system 110.

Figure 15:
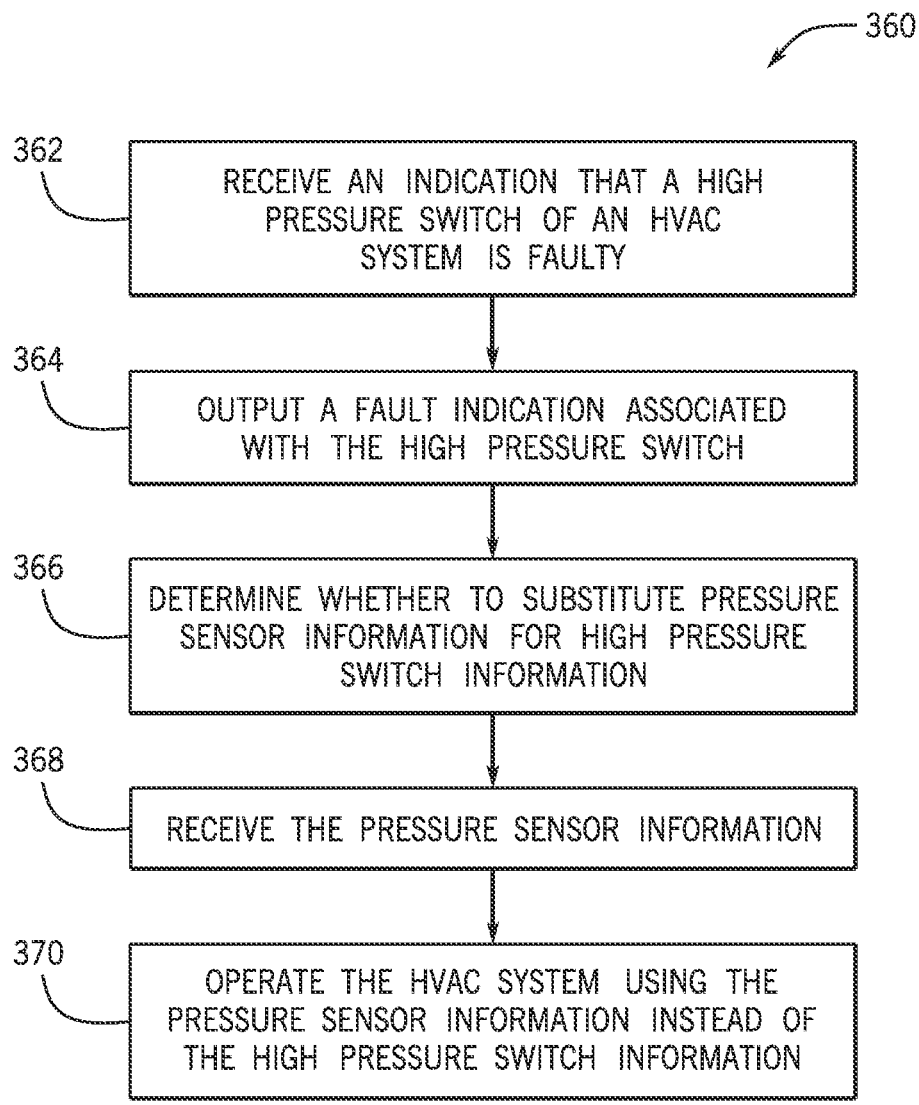
FIG. 15 is a flow diagram of a process for restoring functionality to the HVAC system of FIG. 5 and/or operating the HVAC system of FIG. 5 at reduced functionality when encountering a high pressure switch fault, in accordance with an embodiment of the present disclosure.

FIG. 15 is a flow diagram of a process 360 for restoring functionality to the HVAC system 110 and/or operating the HVAC system 110 at reduced functionality when encountering a high pressure switch fault, in accordance with an embodiment of the present disclosure. The process 360 may be performed by any suitable device that may receive an indication that a high pressure switch of the HVAC system 110 is faulty, determine alternative information to substitute for the high pressure switch, and operate the HVAC system 110 using the alternative sensor information. While the process 360 is described using steps in a specific sequence, it should be understood that the present disclosure contemplates that the described steps may be performed in different sequences than the sequence illustrated, and certain described steps may be skipped or not performed altogether. In some embodiments, the process 360 may be implemented by executing instructions stored in a tangible, non-transitory, computer-readable medium, such as the non-volatile memory 88, using a processor, such as the microprocessor 86.

As illustrated, the control board 82 may receive, at process block 362, an indication that a high pressure switch, such as the discharge pressure switch 158, of an HVAC system 110 is faulty. In particular, the control board 82 may determine that the faulty high pressure switch is not operating as intended by using a high pressure sensor, such as the discharge line pressure sensor 156, of the HVAC system 110.

The control board 82 may then output, at process block 364, a fault indication associated with the high pressure switch. For example, the control board 82 may provide an alert or message to the user interface 91 to inform a user of the faulty high pressure switch. In some embodiments, the fault indication may be provided via the communication interface 92 to the user interface 91 of a user's mobile device.

The control board 82 may determine, at process block 366, to use discharge pressure sensor information of the HVAC system 110 to substitute for the high pressure switch information. The control board 82 may determine what information to use based on the operation to be performed by the HVAC system 110. The control board 82 may then receive, at process block 368, the discharge pressure sensor information, and operate, at process block 370, the HVAC system 110 using the discharge pressure sensor information, instead of the high pressure switch information.

For example, when the HVAC system 110 is protecting itself from high pressure, the control board 82 may use discharge pressure sensor information provided by the discharge line pressure sensor 156, instead of the high pressure switch information. In some embodiments, the control board 82 may apply a reduced setpoint to the discharge pressure sensor information. In particular, the control board 82 may perform internal compressor protection and/or VSD limiting techniques based on the discharge pressure sensor information. In any case, by performing the process 360 in this manner, the HVAC system 110 may restore functionality and/or operate at reduced functionality when a high pressure switch fault is encountered, which, at least in some instances, may facilitate improving operational reliability, availability, and/or lifespan of the HVAC system 110.

Figure 16:
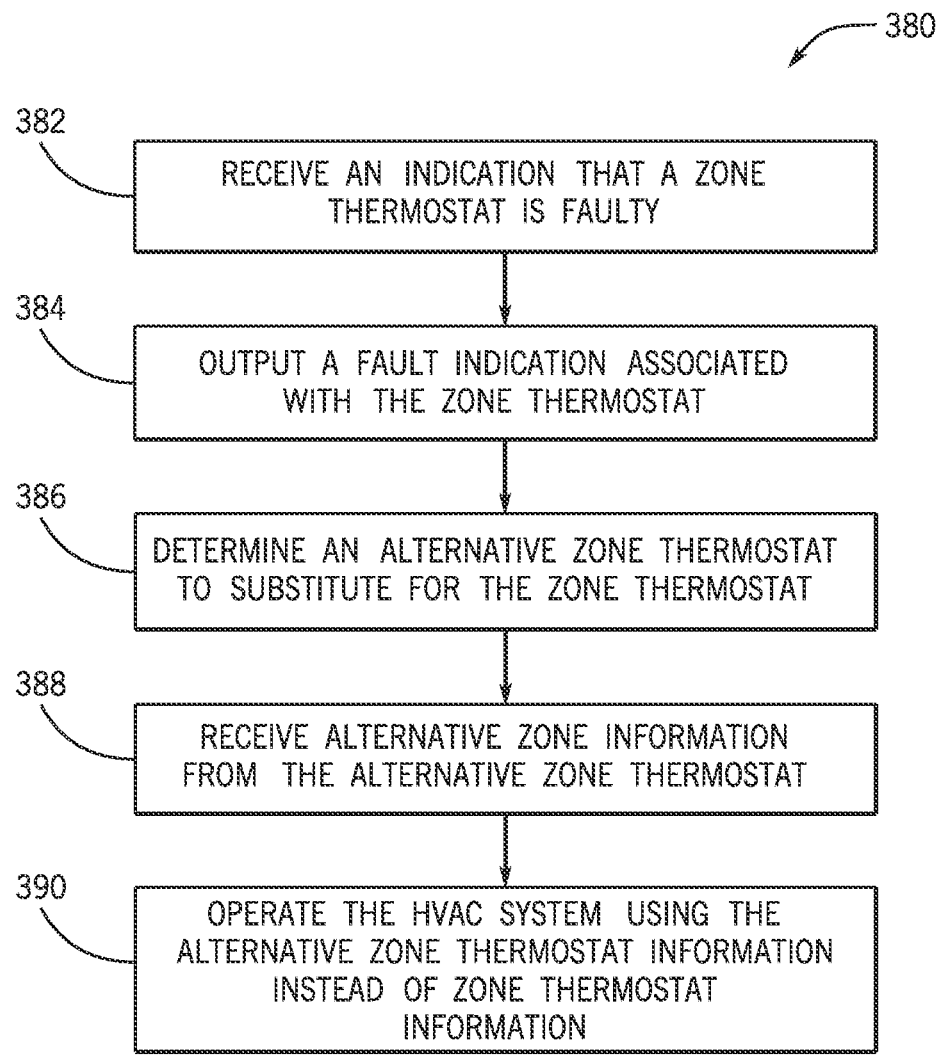
FIG. 16 is a flow diagram of a process for restoring functionality to the HVAC system FIG. 5 and/or operating the HVAC system FIG. 5 at reduced functionality when encountering a zone thermostat communication fault, in accordance with an embodiment of the present disclosure.

FIG. 16 is a flow diagram of a process 380 for restoring functionality to the HVAC system 110 and/or operating the HVAC system 110 at reduced functionality when encountering a zone thermostat communication fault, in accordance with an embodiment of the present disclosure. The process 380 may be performed by any suitable device that may receive an indication that zone thermostat communication of the HVAC system 110 is faulty, determine an alternative zone thermostat to substitute for the zone thermostat, and operate the HVAC system 110 using the alternative zone thermostat. While the process 380 is described using steps in a specific sequence, it should be understood that the present disclosure contemplates that the described steps may be performed in different sequences than the sequence illustrated, and certain described steps may be skipped or not performed altogether. In some embodiments, the process 380 may be implemented by executing instructions stored in a tangible, non-transitory, computer-readable medium, such as the non-volatile memory 88, using a processor, such as the microprocessor 86.

As illustrated, the control board 82 may receive, at process block 382, an indication that a zone thermostat of an HVAC system 110 is faulty. In particular, the control board 82 may determine that the zone thermostat is no longer communicating with at least some components of the HVAC system 110, such as the microprocessor 86 via the communication interface 92, other zone thermostats, and the like. The zone thermostat may be a thermostat that controls air flow and/or temperature in a zone of the building. Referring back to FIG. 1, the zone thermostat may be the first control device 16 that controls air flow in the first zone 17 of the building 10. As illustrated, the building 10 may include multiple zones 17, 19, 21, with a zone thermostat 16, 18, 20 in each zone.

Referring now back to FIG. 16, the control board 82 may then output, at process block 384, a fault indication associated with the zone thermostat. For example, the control board 82 may provide an alert or message to the user interface 91 to inform a user of the faulty zone thermostat. In some embodiments, the fault indication may be provided via the communication interface 92 to the user interface 91 of a user's mobile device.

The control board 82 may determine, at process block 386, an alternative zone thermostat to substitute for the zone thermostat. For example, the control panel 82 may determine that the alternative zone thermostat controls air flow in a zone proximate to the zone having the zone thermostat. That is, the zones may be directly adjacent to each other. In some embodiments, the zones may be fluidly coupled to each other, such that fluid communication occurs between the two zones via one or more refrigeration circuits. Referring back to FIG. 1, the control panel 82 may determine that the alternative zone thermostat is the second control device 18 that controls air flow in the second zone 19, which is proximate to the first zone 17 having the first control device 16. In some embodiments, proximate zones are not on different floors of the building 10 as shown in FIG. 1, and may be two zones on the same floor of the building 10 that are adjacent to one another.

Referring back to FIG. 16, the control board 82 may receive, at process block 388, alternative zone thermostat information from the alternative zone thermostat, and then operate, at process block 390, the HVAC system 110 using the alternative zone thermostat information instead of zone thermostat information typically provided by the zone thermostat. That is, referring back to FIG. 1, the control board 82 may receive second zone thermostat information from the second control device 18 and operate the HVAC system 110 using the second zone thermostat information in place of first zone thermostat information typically provided by the first control device 16. In any case, by performing the process 380 in this manner, the HVAC system 110 may restore functionality and/or operate at reduced functionality when a zone thermostat communication fault is encountered, which, at least in some instances, may facilitate improving operational reliability, availability, and/or lifespan of the HVAC system 110.

As such, the present disclosure provides techniques to automatically enable the HVAC system to restore functionality and/or operate at reduced functionality when encountering an HVAC system fault, while mitigating a reduction of lifetime of the HVAC system or components of the HVAC system. For example, the HVAC system may substitute a downstream or upstream sensor for the faulty sensor, use an algorithm, such as in conjunction with the downstream or upstream sensor, to determine a substitute sensor value in place of the value typically provided by the faulty sensor, and the like. In particular, the HVAC system may receive an indication of a malfunctioning sensor of the HVAC system, determine alternative information to substitute for the malfunctioning sensor, and operate the HVAC system using the alternative sensor information.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A controller for a heating, ventilation, and air conditioning (HVAC) system, wherein the controller is programmed to:
   receive an indication that a suction temperature sensor is faulty, wherein the suction temperature sensor is configured to provide suction temperature sensor information; and
   in response to receiving the indication that the suction temperature sensor is faulty:
      determine to utilize variable speed drive information instead of the suction temperature sensor information based on an operation to be performed by the HVAC system; and
      operate conditioned air equipment of the HVAC system using the variable speed drive information instead of the suction temperature sensor information.

2. The controller of claim 1, wherein, in response to receiving the indication that the suction temperature sensor is faulty, the controller is configured to output a fault indication associated with the suction temperature sensor.

3. The controller of claim 1, wherein the controller is configured to utilize pressure sensor information, alternative temperature sensor information, or both instead of the suction temperature sensor information to control an expansion valve of the conditioned air equipment.

4. The controller of claim 3, wherein the alternative temperature sensor information comprises discharge temperature sensor information.

5. The controller of claim 4, wherein the controller is configured to calculate discharge superheat information using the pressure sensor information and the alternative temperature sensor information.

6. The controller of claim 5, wherein the controller is configured to control the expansion valve such that the calculated discharge superheat information is above a threshold value.

7. The controller of claim 1, wherein the conditioned air equipment comprises an outdoor unit, wherein the outdoor unit comprises:
   an outdoor fan coupled to the controller;
   a motor coupled to the controller and to a compressor; and
   a variable speed drive coupled to the controller and to the compressor, wherein:
      the variable speed drive is configured to provide the variable speed drive information; and
      in response to receiving the indication that the suction temperature sensor is faulty, the controller is configured to utilize the variable speed drive information, alternative temperature sensor information, or both instead of the suction temperature sensor information when the controller is implemented to protect a scroll set of the compressor to limit floodback.

8. The controller of claim 7, wherein the variable speed drive information comprises a frequency or a voltage output by the variable speed drive to the motor.

9. The controller of claim 7, wherein the alternative temperature sensor information comprises discharge temperature sensor information, dome temperature sensor information, or both.

10. A controller for a heating, ventilation, and air conditioning (HVAC) unit, wherein the controller is programmed to:
receive an indication that a discharge temperature sensor is faulty, wherein the discharge temperature sensor is configured to provide discharge temperature sensor information; and
in response to receiving the indication that the discharge temperature sensor is faulty:
determine to utilize pressure sensor information, alternative temperature sensor information, or a combination thereof instead of the discharge temperature sensor information based on an operation to be performed by the HVAC unit; and
operate conditioned air equipment of the HVAC unit using the pressure sensor information, the alternative temperature sensor information, or the combination thereof, instead of the discharge temperature sensor information when the controller is implemented to protect a scroll set of a compressor of the conditioned air equipment.

11. The controller of claim 10, wherein the controller is configured to determine that the discharge temperature sensor is faulty based on the discharge temperature sensor information being outside a range of values.

12. The controller of claim 10, wherein the controller is configured to output a fault indication associated with the discharge temperature sensor in response to receiving the indication that the discharge temperature sensor is faulty.

13. The controller of claim 10, wherein the HVAC unit comprises an outdoor unit, and the conditioned air equipment comprises the compressor coupled to the controller, and wherein the controller is configured to utilize the pressure sensor information instead of the discharge temperature sensor information to cause the compressor to operate within an operating envelope.

14. The controller of claim 10, wherein the alternative temperature sensor information comprises indoor temperature sensor information.

15. The controller of claim 14, wherein the indoor temperature sensor information comprises information received via an indoor coil sensor.

16. A controller of a heating, ventilation, and air conditioning (HVAC) system, wherein the controller is programmed to:
receive an indication that an ambient temperature sensor is faulty, wherein the ambient temperature sensor is configured to provide ambient temperature sensor information; and
in response to receiving the indication that the ambient temperature sensor is faulty:
determine to utilize a time-based algorithm, a fan speed control scheme, or a combination thereof instead of the ambient temperature sensor information based on an operation to be performed by the HVAC system; and
operate conditioned air equipment of the HVAC system using the time-based algorithm, the fan speed control scheme, or the combination thereof, instead of the ambient temperature sensor information.

17. The controller of claim 16, wherein the controller is programmed to:
determine that the ambient temperature sensor is faulty based on the ambient temperature sensor information being outside a range of values; and
output a fault indication associated with the ambient temperature sensor in response to receiving the indication that the ambient temperature sensor is faulty.

18. The controller of claim 16, wherein the controller is programmed to:
determine to utilize alternative temperature sensor information instead of the ambient temperature sensor information based on the operation to be performed by the HVAC system; and
receive the alternative temperature sensor information from a communication network, and wherein the alternative temperature sensor information corresponds to a geographical location where the HVAC system is disposed.

19. The controller of claim 16, wherein the HVAC system comprises an outdoor unit, and the conditioned air equipment comprises a fan coupled to the controller, and wherein, in response to receiving the indication that the ambient temperature sensor is faulty, the controller is programmed to operate the fan using the fan speed control scheme to cause the fan to operate at a full speed instead of operating based on the ambient temperature sensor information.

20. The controller of claim 16, wherein, in response to receiving the indication that the ambient temperature sensor is faulty, the controller is programmed to utilize a periodic defrost algorithm instead of the ambient temperature sensor information, wherein the periodic defrost algorithm is configured to cause the controller to repeatedly:
operate the HVAC system normally for a first duration of time; and
execute a defrost cycle for a second duration of time.

\* \* \* \* \*